(12) United States Patent
Takahashi et al.

(10) Patent No.: US 10,846,820 B2
(45) Date of Patent: Nov. 24, 2020

(54) GENERATION DEVICE, IDENTIFICATION INFORMATION GENERATION METHOD, REPRODUCTION DEVICE, AND IMAGE GENERATION METHOD

(71) Applicant: SONY CORPORATION, Tokyo (JP)

(72) Inventors: Ryohei Takahashi, Kanagawa (JP);
Mitsuhiro Hirabayashi, Tokyo (JP);
Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/467,710

(22) PCT Filed: Dec. 15, 2017

(86) PCT No.: PCT/JP2017/045044
§ 371 (c)(1),
(2) Date: Jun. 7, 2019

(87) PCT Pub. No.: WO2018/123646
PCT Pub. Date: Jul. 5, 2018

(65) Prior Publication Data
US 2019/0347760 A1    Nov. 14, 2019

(30) Foreign Application Priority Data

Dec. 28, 2016   (JP) ................................. 2016-255631

(51) Int. Cl.
*H04N 7/00* (2011.01)
*G06T 3/00* (2006.01)
*H04N 5/232* (2006.01)

(52) U.S. Cl.
CPC ....... *G06T 3/0087* (2013.01); *H04N 5/23229* (2013.01); *H04N 5/23238* (2013.01)

(58) Field of Classification Search
USPC .......................................................... 348/36
See application file for complete search history.

(56) References Cited

U.S. PATENT DOCUMENTS

2005/0017983 A1   1/2005  Liao et al.
2009/0122189 A1*  5/2009  Wang ....................... H04N 5/05
                                                      348/500

(Continued)

OTHER PUBLICATIONS

Sep. 30, 2019, European Search Report issued for related EP Application No. 17885773.6.

(Continued)

*Primary Examiner* — Behrooz M Senfi
(74) *Attorney, Agent, or Firm* — Paratus Law Group, PLLC

(57) ABSTRACT

There is provided a generation device, an identification information generation method, a reproduction device, and an image generation method capable of easily acquiring a region with a margin and a region with no margin. An identification information generation unit generates margin identification information for identifying that a celestial sphere image includes a region with a margin. A client that uses a margin can easily acquire a region including the margin and a client that does not use a margin can easily acquire a region including no margin. The present technology can be applied to a case in which a celestial sphere image is transmitted from a server and is received and reproduced on a client side.

21 Claims, 29 Drawing Sheets

(56) References Cited

U.S. PATENT DOCUMENTS

2014/0218354 A1* 8/2014 Park ................. G06T 3/4038
345/419
2016/0048358 A1* 2/2016 Ono ................. G06F 3/1208
358/1.6
2018/0103242 A1* 4/2018 Budagavi ............ H04N 21/435

OTHER PUBLICATIONS

Hannuksela et al., OMAF architecture, International Organisation for Standardisation ISO/IEC JTC1/SC29/WG11 Coding of Moving Pictures and Audio, Oct. 2016, pp. 1-6, Chengdu, China.
Hannuksela et al., OMAF: specification text examples for clauses 5 to 8, International Organisation for Standardisation ISO/IEC JTC1/SC29/WG11 Coding of Moving Pictures and Audio, Oct. 2016, pp. 1-4, Chengdu, China.

* cited by examiner

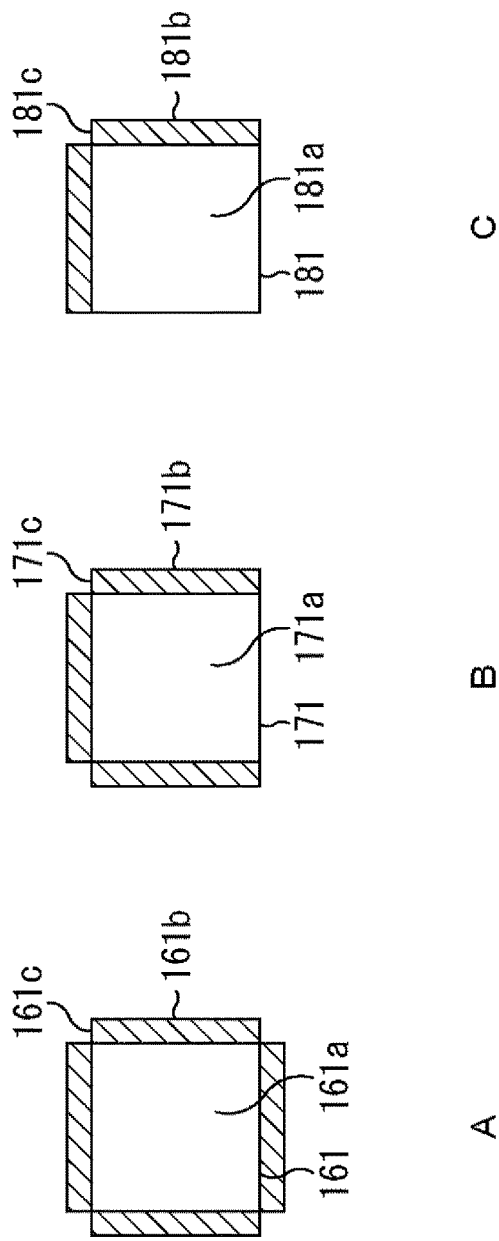

FIG. 6

```
aligned(8) class RegionMappigBox extends FullBox('rmap', version=0, 0)
{
    unsigned int(8) projection_format;
    unsigned int(1) packing_flag;
    unsigned int(1) FOV_flag;
    unsigned int(1) margin_flag;
    bit(13) reserved=0;
    unsigned int(8) num_regions;

for(i=0; i<num_regions; i++) {
        signed int(16) center_yaw[i];
        signed int(16) center_pitch[i];
        unsigned int(16) object_width[i];
        unsigned int(16) object_height[i];
        if(packing_flag) {
            unsigned int(32) rect_width[i];
            unsigned int(32) rect_height[i];
            unsigned int(32) rect_left[i];
            unsigned int(32) rect_top[i];
        }
        if(margin_flag) {
            unsigned int(2) region_margin_type[i];
            bit(6) reserved=0;
            if(region_margin_type[i]!=0) {
                unsigned int(16) object_with_margin_width[i];
                unsigned int(16) object_with_margin_height[i];
                unsigned int(2) width_margin_assignment[i];
                unsigned int(2) height_margin_assignment[i];
                bit(4) reserved=0;
                if(packing_flag) {
                    unsigned int(32) rect_with_margin_width[i];
                    unsigned int(32) rect_with_margin_height[i];
                    unsigned int(32) rect_with_margin_left[i];
                    unsigned int(32) rect_with_margin_top[i];
                }
            }
        }
    }
}
```

FIG. 7

| | |
|---|---|
| projection_format | PROJECTION TYPE.<br>0:EQUIRECTANGULAR PROJECTION<br>1:CUBE MAPPING PROJECTION |
| packing_flag | WHETHER OR NOT region-wise packing IS USED.<br>0:region-wise packing IS NOT USED<br>1:region-wise packing IS USED |
| FOV_flag | INDICATE STANDARD OF ANGLE INFORMATION OF object_width AND object_height.<br>0:SURFACE OF SPHERE<br>1:SURFACE OF PERSPECTIVE PROJECTION |
| margin_flag | WHETHER OR NOT CELESTIAL SPHERE IMAGE INCLUDES REGION WITH MARGIN.<br>0:ONLY REGION WITH NO MARGIN<br>1:THERE IS REGION WITH MARGIN |
| num_regions | NUMBER OF REGIONS OF packed frame |
| center_yaw | yaw OF REGION CENTER IN projection structure.<br>COMMON TO REGION WITH MARGIN AND REGION WITH NO MARGIN. |
| center_pitch | pitch OF REGION CENTER IN projection structure.<br>COMMON TO REGION WITH MARGIN AND REGION WITH NO MARGIN. |
| object_width | WIDTH (ANGLE) OF REGION WITH NO MARGIN IN projection structure |
| object_height | HEIGHT (ANGLE) OF REGION WITH NO MARGIN IN projection structure |
| rect_width | WIDTH OF REGION WITH NO MARGIN IN packed frame |
| rect_height | HEIGHT OF REGION WITH NO MARGIN IN packed frame |
| rect_left | x COORDINATE OF REGION WITH NO MARGIN IN packed frame |
| rect_top | y COORDINATE OF REGION WITH NO MARGIN IN packed frame |

FIG. 8

| | |
|---|---|
| region_margin_type | MARGIN TYPE OF REGION.<br>0:REGION WITH NO MARGIN<br>1:REGION WITH MARGIN (WITH CORNER OF MARGIN)<br>2:REGION WITH MARGIN (WITH NO CORNER OF MARGIN)<br>3: reserved |
| object_with_margin_width | WIDTH (ANGLE) OF REGION INCLUDING MARGIN IN projection structure.<br>VALUE IN CASE IN WHICH MARGIN IS EQUALLY ALLOCATED. |
| object_with_margin_height | HEIGHT (ANGLE) OF REGION INCLUDING MARGIN IN projection structure.<br>VALUE IN CASE IN WHICH MARGIN IS EQUALLY ALLOCATED. |
| width_margin_assignment | ALLOCATION OF MARGIN IN WIDTH DIRECTION OF REGION.<br>0:EQUAL ALLOCATION ON BOTH SIDES (OR NO MARGIN)<br>1:ONLY MARGIN ON RIGHT SIDE. DELETION OF MARGIN ON LEFT SIDE.<br>2:ONLY MARGIN ON LEFT SIDE. DELETION OF MARGIN ON RIGHT SIDE. |
| height_margin_assignment | ALLOCATION OF MARGIN IN HEIGHT DIRECTION OF REGION.<br>0:EQUAL ALLOCATION ON BOTH SIDES (OR NO MARGIN)<br>1:ONLY MARGIN ON UPPER SIDE. DELETION OF MARGIN ON LOWER SIDE.<br>2:ONLY MARGIN ON LOWER SIDE. DELETION OF MARGIN ON UPPER SIDE. |
| rect_with_margin_width | WIDTH OF REGION INCLUDING MARGIN IN packed frame |
| rect_with_margin_height | HEIGHT OF REGION INCLUDING MARGIN IN packed frame |
| rect_with_margin_left | x COORDINATE OF REGION INCLUDING MARGIN IN packed frame |
| rect_with_margin_top | y COORDINATE OF REGION INCLUDING MARGIN IN packed frame |

FIG. 10

| | |
|---|---|
| projection_format | 1 |
| packing_flag | 1 |
| margin_flag | 1 |
| num_regions | 6 |
| FOV_flag | 1 |
| center_yaw, center_pitch, object_width, object_height | -90, 0, 90, 90 (right face) |
| rect_width, rect_height, rect_left, rect_top | 400, 400, 1000, 40 (right face) |
| region_margin_type | 1 |
| object_with_margin_width, object_with_margin_height | 100, 100 (right face) |
| width_margin_assignment | 0 |
| height_margin_assignment | 0 |
| rect_with_margin_width, rect_with_margin_height, rect_with_margin_left, rect_with_margin_top | 480, 480, 960, 0 (right face) |

FIG.12

| | |
|---|---|
| projection_format | 0 |
| packing_flag | 1 |
| margin_flag | 1 |
| num_regions | 1 |
| FOV_flag | 0 |
| center_yaw, center_pitch, object_width, object_height | 0,0,360,180 |
| rect_width, rect_height, rect_left, rect_top | 1920,1440,0,0 |
| region_margin_type | 1 |
| object_with_margin_width, object_with_margin_height | 380,180 |
| width_margin_assignment | 1 |
| height_margin_assignment | 0 |
| rect_with_margin_width, rect_with_margin_height, rect_with_margin_left, rect_with_margin_top | 2000,1440,0,0(right face) |

FIG. 13

```
aligned(8) class RegionMappigBox extends FullBox('rmap', version=0,0)
{
    unsigned int(8) projection_format;
    unsigned int(1) packing_flag;
    unsigned int(1) FOV_flag;
    unsigned int(1) margin_flag;
    bit(13) reserved=0;
    unsigned int(8) num_regions;

for(i=0; i<num_regions; i++){
        signed int(16) center_yaw[i];
        signed int(16) center_pitch[i];
        unsigned int(16) object_width[i];
        unsigned int(16) object_height[i];
        if(packing_flag){
            unsigned int(32) rect_width[i];
            unsigned int(32) rect_height[i];
            unsigned int(32) rect_left[i];
            unsigned int(32) rect_top[i];
        }
        if(margin_flag){
            unsigned int(2) region_margin_type[i];
            reserved=0;
            bit(6);
            if(region_margin_type[i]!=0){
                unsigned int(16) object_with_margin_width[i];
                unsigned int(16) object_with_margin_height[i];
                if(packing_flag){
                    unsigned int(32) rect_with_margin_width[i];
                    unsigned int(32) rect_with_margin_height[i];
                    unsigned int(32) rect_with_margin_left[i];
                    unsigned int(32) rect_with_margin_top[i];
                }
            }
        }
    }
}
```

FIG. 14

```
aligned(8) class RegionMappigBox extends FullBox('rmap', version=0, 0)
    unsigned int(8) projection_format;
    unsigned int(1) packing_flag;
    unsigned int(1) FOV_flag;
    unsigned int(1) margin_flag;
    bit(13) reserved=0;
    unsigned int(8) num_regions;

for(i=0; i<num_regions; i++) {
        signed int(16) center_yaw[i];
        signed int(16) center_pitch[i];
        unsigned int(16) object_width[i];
        unsigned int(16) object_height[i];
        if(packing_flag) {
            unsigned int(32) rect_width[i];
            unsigned int(32) rect_height[i];
            unsigned int(32) rect_left[i];
            unsigned int(32) rect_top[i];
        }
        if(margin_flag){
            unsigned int(2) region_margin_type[i];
            bit(6) reserved=0;
            if(region_margin_type[i]=0){
                unsigned int(32) rect_with_margin_width[i];
                unsigned int(32) rect_with_margin_height[i];
                unsigned int(32) rect_with_margin_left[i];
                unsigned int(32) rect_with_margin_top[i];
            }
        }
    }
}
```

FIG. 15

```
aligned(8) class RegionMappigBox extends FullBox('rmap', version=0,0)
{
    unsigned int(8) projection_format;
    unsigned int(1) packing_flag;
    unsigned int(1) FOV_flag;
    unsigned int(1) margin_flag;
    bit(13) reserved=0;
    unsigned int(8) num_regions;

for(i=0; i<num_regions; i++) {
        signed int(16) center_yaw[i];
        signed int(16) center_pitch[i];
        unsigned int(16) object_width[i];
        unsigned int(16) object_height[i];
        if(packing_flag) {
            unsigned int(32) rect_width[i];
            unsigned int(32) rect_height[i];
            unsigned int(32) rect_left[i];
            unsigned int(32) rect_top[i];
        }
        if(margin_flag) {
            unsigned int(2) region_margin_type[i];
            bit(6) reserved=0;
            if(region_margin_type[i]==0) {
                if(region_margin_type[i]==1) {
                    unsigned int(16) object_with_margin_width[i];
                    unsigned int(16) object_with_margin_height[i];
                    unsigned int(2) width_margin_assignment[i];
                    unsigned int(2) height_margin_assignment[i];
                    bit(4) reserved=0;
                }
                unsigned int(32) rect_with_margin_width[i];
                unsigned int(32) rect_with_margin_height[i];
                unsigned int(32) rect_with_margin_left[i];
                unsigned int(32) rect_with_margin_top[i];
            }
        }
    }
}
```

FIG. 16

```
aligned(8) class RegionMappigBox extends FullBox('rmap', version=0, 0)
{
    unsigned int(8) projection_format;
    unsigned int(1) packing_flag;
    unsigned int(1) margin_flag;
    bit(14) reserved=0;
    unsigned int(8) num_regions;

for(i=0; i<num_regions; i++){
        unsigned int(32) pf_region_width[i];
        unsigned int(32) pf_region_height[i];
        unsigned int(32) pf_region_left[i];
        unsigned int(32) pf_region_top[i];
        if(packing_flag) {
            unsigned int(32) rect_width[i];
            unsigned int(32) rect_height[i];
            unsigned int(32) rect_left[i];
            unsigned int(32) rect_top[i];
        }
        if(margin_flag) {
            unsigned int(2) region_margin_type[i];
            bit(6) reserved=0;
            if(region_margin_type[i]!=0) {
                unsigned int(32) pf_region_with_margin_width[i];
                unsigned int(32) pf_region_with_margin_height[i];
                unsigned int(32) pf_region_with_margin_left[i];
                unsigned int(32) pf_region_with_margin_top[i];
                if(packing_flag) {
                    unsigned int(32) rect_with_margin_width[i];
                    unsigned int(32) rect_with_margin_height[i];
                    unsigned int(32) rect_with_margin_left[i];
                    unsigned int(32) rect_with_margin_top[i];
                }
            }
        }
    }
}
```

FIG. 17

| | |
|---|---|
| projection_format | PROJECTION TYPE.<br>0:EQUIRECTANGULAR PROJECTION<br>1:CUBE MAPPING PROJECTION |
| packing_flag | WHETHER OR NOT region-wise packing IS USED.<br>0:region-wise packing IS NOT USED<br>1:region-wise packing IS USED |
| margin_flag | WHETHER OR NOT CELESTIAL SPHERE IMAGE INCLUDES REGION WITH MARGIN.<br>0:ONLY REGION WITH NO MARGIN<br>1:THERE IS REGION WITH MARGIN |
| num_regions | NUMBER OF REGIONS OF packed frame |
| pf_region_width | WIDTH OF REGION WITH NO MARGIN IN projected frame |
| pf_region_height | HEIGHT OF REGION WITH NO MARGIN IN projected frame |
| pf_region_left | x COORDINATE OF REGION WITH NO MARGIN IN projected frame |
| pf_region_top | y COORDINATE OF REGION WITH NO MARGIN IN projected frame |
| rect_width | WIDTH OF REGION WITH NO MARGIN IN packed frame |
| rect_height | HEIGHT OF REGION WITH NO MARGIN IN packed frame |
| rect_left | x COORDINATE OF REGION WITH NO MARGIN IN packed frame |
| rect_top | y COORDINATE OF REGION WITH NO MARGIN IN packed frame |
| region_margin_type | MARGIN TYPE OF REGION.<br>0:REGION WITH NO MARGIN<br>1:REGION WITH MARGIN (WITH CORNER OF MARGIN)<br>2:REGION WITH MARGIN (WITH NO CORNER OF MARGIN)<br>3:reserved |
| pf_region_with_margin_width | WIDTH OF REGION INCLUDING MARGIN IN projected frame |
| pf_region_with_margin_height | HEIGHT OF REGION INCLUDING MARGIN IN projected frame |
| pf_region_with_margin_left | x COORDINATE OF REGION INCLUDING MARGIN IN projected frame |
| pf_region_with_margin_top | y COORDINATE OF REGION INCLUDING MARGIN IN projected frame |
| rect_with_margin_width | WIDTH OF REGION INCLUDING MARGIN IN projected frame |
| rect_with_margin_height | HEIGHT OF REGION INCLUDING MARGIN IN projected frame |
| rect_with_margin_left | x COORDINATE OF REGION INCLUDING MARGIN IN projected frame |
| rect_with_margin_top | y COORDINATE OF REGION INCLUDING MARGIN IN projected frame |

FIG.19

| | |
|---|---|
| projection_format | 1 |
| packing_flag | 1 |
| margin_flag | 1 |
| num_regions | 6 |
| pf_region_width, pf_region_height, pf_region_left, pf_region_top | 400, 400, 1200, 400 (back face) |
| rect_width, rect_height, rect_left, rect_top | 200, 200, 400, 20 (back face) |
| region_margin_type | 2 |
| pf_region_with_margin_width, pf_region_with_margin_height, pf_region_with_margin_left, pf_region_with_margin_top | 440, 480, 1200, 360 (back face) |
| rect_with_margin_width, rect_with_margin_height, rect_with_margin_left, rect_with_margin_top | 220, 240, 400, 0 (back face) |

FIG.23

```
<MPD>
 <Period>
  <AdaptationSet mimeType="video/mp4" width="1280" height="960" >
   <EssentialProperty schemeIdUri="urn:mpeg:dash:vr:ProjectionType" value="cube" />
   <SupplementalProperty schemeIdUri="urn:mpeg:dash:vr:margin" value="0" />
   <Representation id="cube_video" bandwidth="1000000" >
    <BaseURL>cube.mp4</BaseURL>
   </Representation>
  </AdaptationSet>
  <AdaptationSet mimeType="video/mp4" width="1280" height="960" >
   <EssentialProperty schemeIdUri="urn:mpeg:dash:vr:ProjectionType" value="cube" />
   <SupplementalProperty schemeIdUri="urn:mpeg:dash:vr:margin" value="1" />
   <Representation id="cube_video_with_margin" bandwidth="1024000" >
    <BaseURL>cube_with_margin.mp4</BaseURL>
   </Representation>
  </AdaptationSet>
 </Period>
</MPD>
```

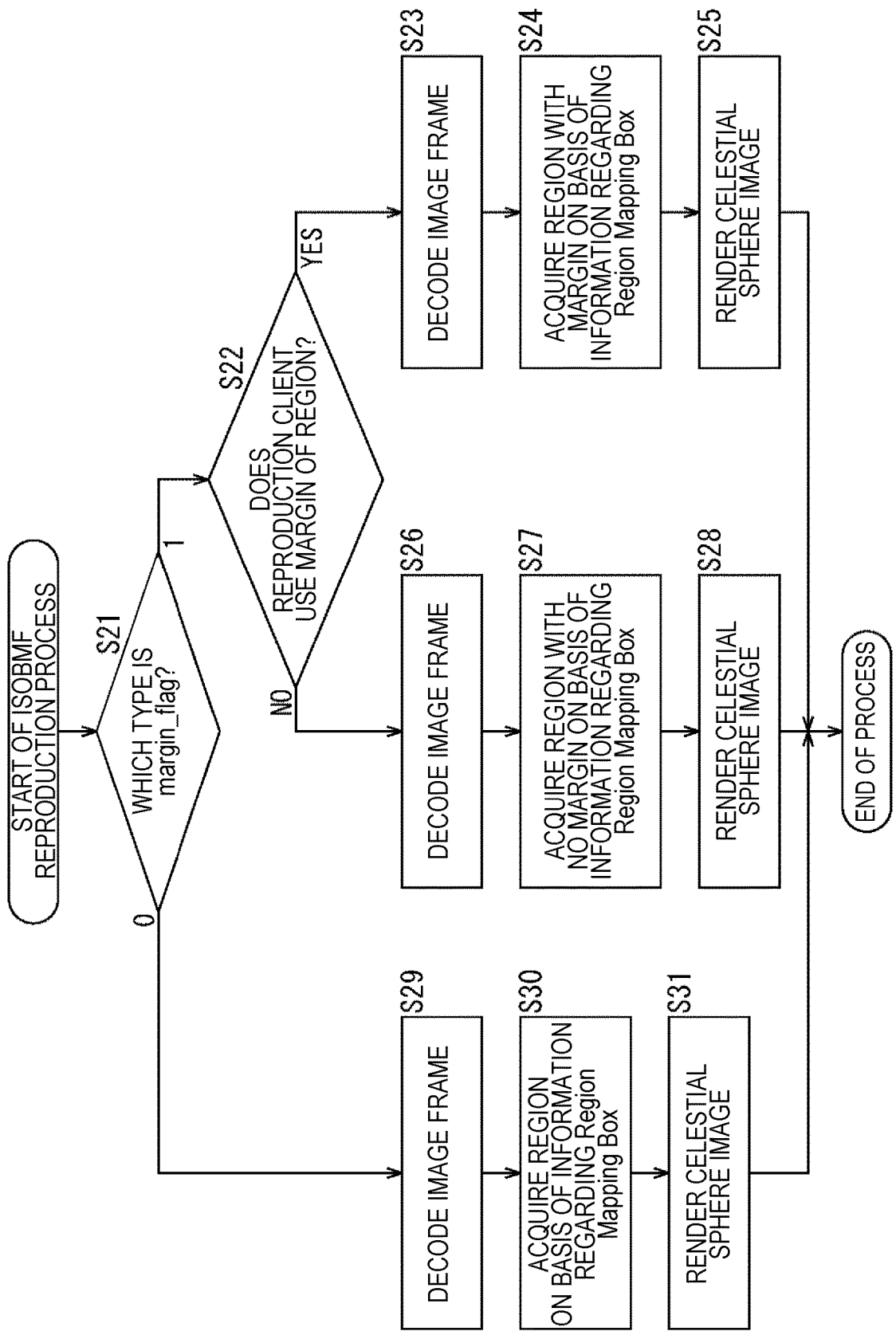

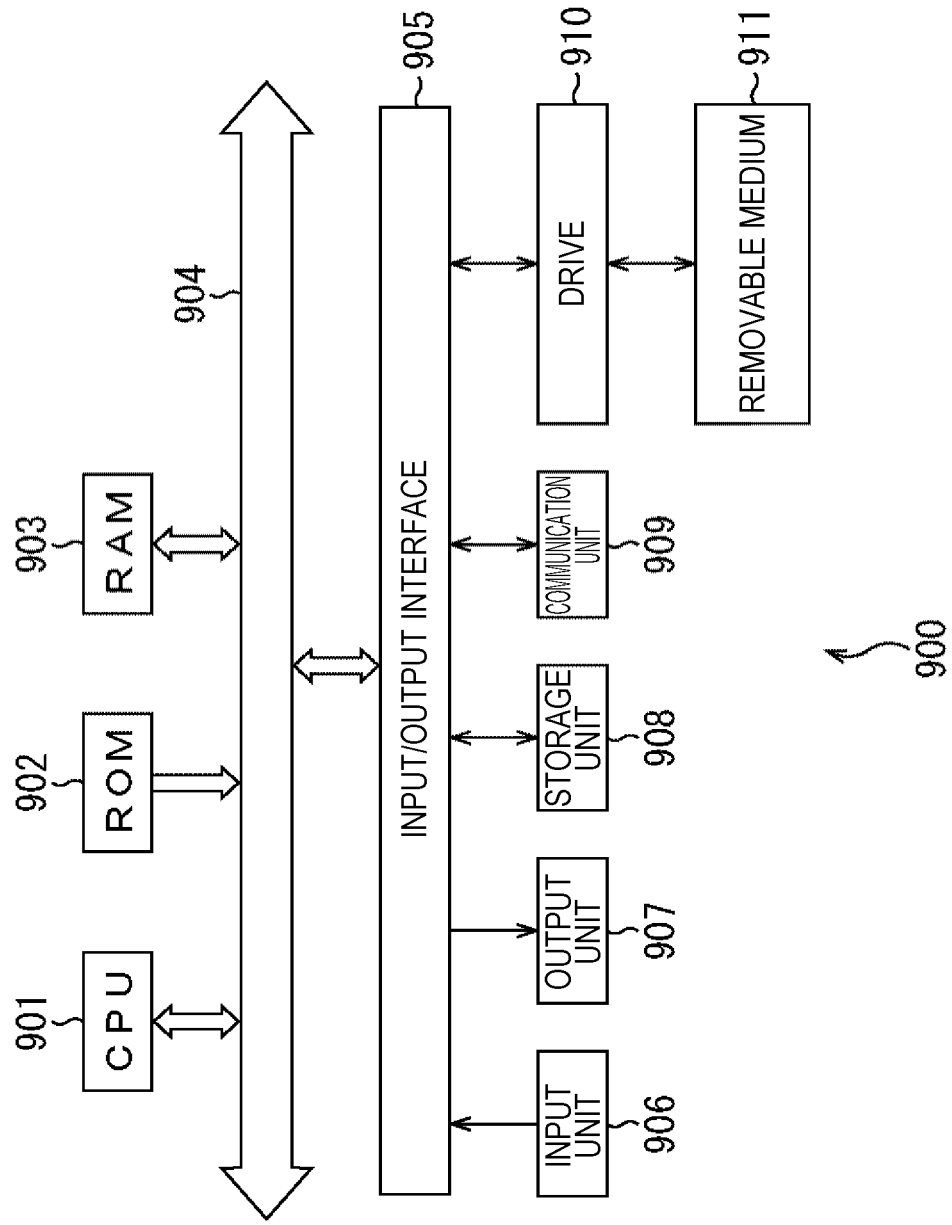

GENERATION DEVICE, IDENTIFICATION INFORMATION GENERATION METHOD, REPRODUCTION DEVICE, AND IMAGE GENERATION METHOD

CROSS REFERENCE TO PRIOR APPLICATION

This application is a National Stage Patent Application of PCT International Patent Application No. PCT/JP2017/045044 (filed on Dec. 15, 2017) under 35 U.S.C. § 371, which claims priority to Japanese Patent Application No. 2016-255631 (filed on Dec. 28, 2016), which are all hereby incorporated by reference in their entirety.

TECHNICAL FIELD

The present technology relates to a generation device, an identification information generation method, a reproduction device, and an image generation method, and particularly to a generation device, an identification information generation method, a reproduction device, and an image generation method capable of easily acquiring a region with a margin and a region with no margin.

BACKGROUND ART

There are recording devices that generate celestial sphere images in which images of 360 degrees in the horizontal direction and 180 degrees in the vertical direction are mapped to 2D images (planar images) from photographed images photographed by multiple cameras and encode and record the celestial sphere images (for example, see Patent Literature 1).

In such recording media, a method using equirectangular projection, a cube mapping method, or the like is used as a method of generating a celestial sphere image. In a case in which a method of generating a celestial sphere image is a method using equirectangular projection, the celestial sphere image is an image in accordance with equirectangular projection of a sphere when a captured image is mapped to the surface of the sphere. In addition, in a case in which a method of generating a celestial sphere image is a cube mapping method, the celestial sphere image is an image of development of a cube when a photographed image is mapped to the surface of the cube.

On the other hand, as a streaming type of moving image content, there is Moving Picture Experts Group phase-Dynamic Adaptive Streaming over HTTP (MPEG-DASH). In MPEG-DASH, a management file for managing an encoded stream of moving image content is transmitted from a delivery server to a client and the client selects an encoded stream which is a reproduction target on the basis of the management file and requests the encoded stream from the delivery server.

CITATION LIST

Patent Literature

Patent Literature 1: JP 2006-14174A

Disclosure of Invention

Technical Problem

Incidentally, a celestial sphere image has the following problems:

(1) image quality deteriorates when surfaces not continuous on a projected frame and adjacent on a projection structure are connected;

(2) image quality deteriorates when texture pixels are complemented in a surface boundary at the time of using of a multi-face projection structure such as cube projection mapping; and (3) in a case in which an entire celestial sphere image has a low resolution and only a specific region near a center of a visual line is a high-resolution image, image quality of the boundary deteriorates when a high-resolution layer image overlaps a low-resolution layer image.

Accordingly, providing a margin around a region of the celestial sphere image is expected to cause suppression of the deterioration in the image quality.

As a method of delivering a margin, a method of delivering the number of pixels extending from a region with no margin as a margin or delivering a ratio of a margin in a region with a margin is known. In this case, however, when a client recognizes regions with a margin and with no margin, the client has to perform a region calculation process as a delivery method. As a result, it is difficult for the client to easily acquire a region with a margin and a region with no margin.

The present technology is devised in view of such circumstances and enables a region with a margin and a region with no margin to be easily acquired.

Solution to Problem

An aspect of the present technology is a generation device including: an identification information generation unit configured to generate margin identification information for identifying that a celestial sphere image includes a region with a generated margin in a region of the celestial sphere image.

The generation device can be further provided with: a margin generation unit configured to generate a margin of a region of the celestial sphere image.

The margin can be formed outside the region.

Region information regarding a region with the margin can be represented by a spherical coordinate system or a 2-dimensional coordinate system.

The region information can be represented as information regarding a projected frame or a packed frame.

The region information regarding a region with the margin of the projected frame can be described in a case in which the region has the margin.

The region information regarding a region with the margin of the packed frame can be described in a case in which the region is packed by region-wise packing.

The region information regarding a region with the margin of the projected frame can include a width and a height of a region including the margin of the projected frame and allocation identification information for identifying allocation of the margin in directions of the width and the height.

The region information regarding a region with the margin of the packed frame can include a width and a height of a region with the margin of the projected frame and top and left coordinates of the region.

The region information regarding a region with the margin of the packed frame can be described in a case in which the packed frame is packed by region-wise packing.

The allocation identification information can be omitted.

The region information regarding a region with the margin of the projected frame can be omitted and only the region information regarding a region with the margin of the packed frame can be described.

As the margin, there can be types of margins which do and do not have a non-formed portion in which the margin is not formed in a corner.

The identification information generation unit can further generate type identification information for identifying the types.

The region information regarding a region with the margin of the projected frame can be described in a case in which the type identification information is the type of margin that does not have the non-formed portion.

In a case in which the region is a triangle and the margin is formed along a side of the triangle, the triangle can be formed into a rectangle and the margin can be disposed on a side of the rectangle corresponding to the triangle.

The margin identification information can be described in a box below Scheme Information Box of ISOBMFF.

The margin identification information can be described in an MPD file of MPEG-DASH.

An aspect of the present technology is an identification information generation method including: an identification information generation step of generating margin identification information for identifying that a celestial sphere image includes a region with a generated margin in a region of the celestial sphere image by a generation device.

An aspect of the present technology is a reproduction device including: an acquisition unit configured to acquire margin identification information for identifying that a celestial sphere image includes a region with a margin; a generation unit configured to generate a projected frame on the basis of the acquired margin identification information; and a rendering unit configured to render the projected frame.

An aspect of the present technology is an image generation method device including: an acquisition step of acquiring margin identification information for identifying that a celestial sphere image includes a region with a margin by a reproduction device; a generation step of generating a projected frame on the basis of the acquired margin identification information by the reproduction device; and a rendering step of rendering the projected frame by the reproduction device.

According to an aspect of the present technology, the identification information generation unit generates margin identification information for identifying that a celestial sphere image includes a region with a generated margin in a region of the celestial sphere image.

Advantageous Effects of Invention

As described above, according to one aspect of the present technology, it is possible to easily acquire a region with a margin and a region with no margin. Note that the effects described in the present specification are not limiting but are merely examples, and there may be other effects.

BRIEF DESCRIPTION OF DRAWINGS

FIG. 5 is a diagram illustrating patterns of margins.
FIG. 6 is a diagram illustrating a configuration example of a region mapping box.
FIG. 7 is an explanatory diagram illustrating fields of the region mapping box.
FIG. 8 is an explanatory diagram illustrating a field of the region mapping box.
FIG. 10 is an explanatory diagram illustrating fields at the time of the cube matching projection.
FIG. 12 is an explanatory diagram illustrating fields at the time of the equirectangular projection.
FIG. 13 is a diagram illustrating a configuration example of a region mapping box.
FIG. 14 is a diagram illustrating a configuration example of a region mapping box.
FIG. 15 is a diagram illustrating a configuration example of a region mapping box.
FIG. 16 is a diagram illustrating a configuration example of a region mapping box.
FIG. 17 is an explanatory diagram illustrating the fields of the region mapping box.
FIG. 19 is an explanatory diagram illustrating fields at the time of the cube matching projection.
FIG. 23 is a diagram illustrating an example of an MPD file to which DASH is applied.
FIG. 28 is an explanatory flowchart illustrating an ISOBMFF reproduction process.
FIG. 29 is a block diagram illustrating an exemplary hardware configuration of a computer.

MODE(S) FOR CARRYING OUT THE INVENTION

Hereinafter, embodiments for carrying out the present technology will be described. Note that the description will be made in the following order.
1. Embodiment
(1) Principle of projection (FIG. 1)
(2) Margins (FIGS. 2 to 23)
(3) Delivery system (FIG. 24)
(4) Generation device (FIGS. 25 and 26)
(5) Reproduction device (FIGS. 27 and 28)
2. Computer (FIG. 29)
3. Others Embodiment <Principle of Projection (FIG. 1)>
In the present technology, a celestial sphere image is delivered as a video stream, for example, from a server to a client and is received, reproduced, and viewed on a client side. Accordingly, a principle of a process of generating and delivering a celestial sphere image will be described first.

Figure 1:
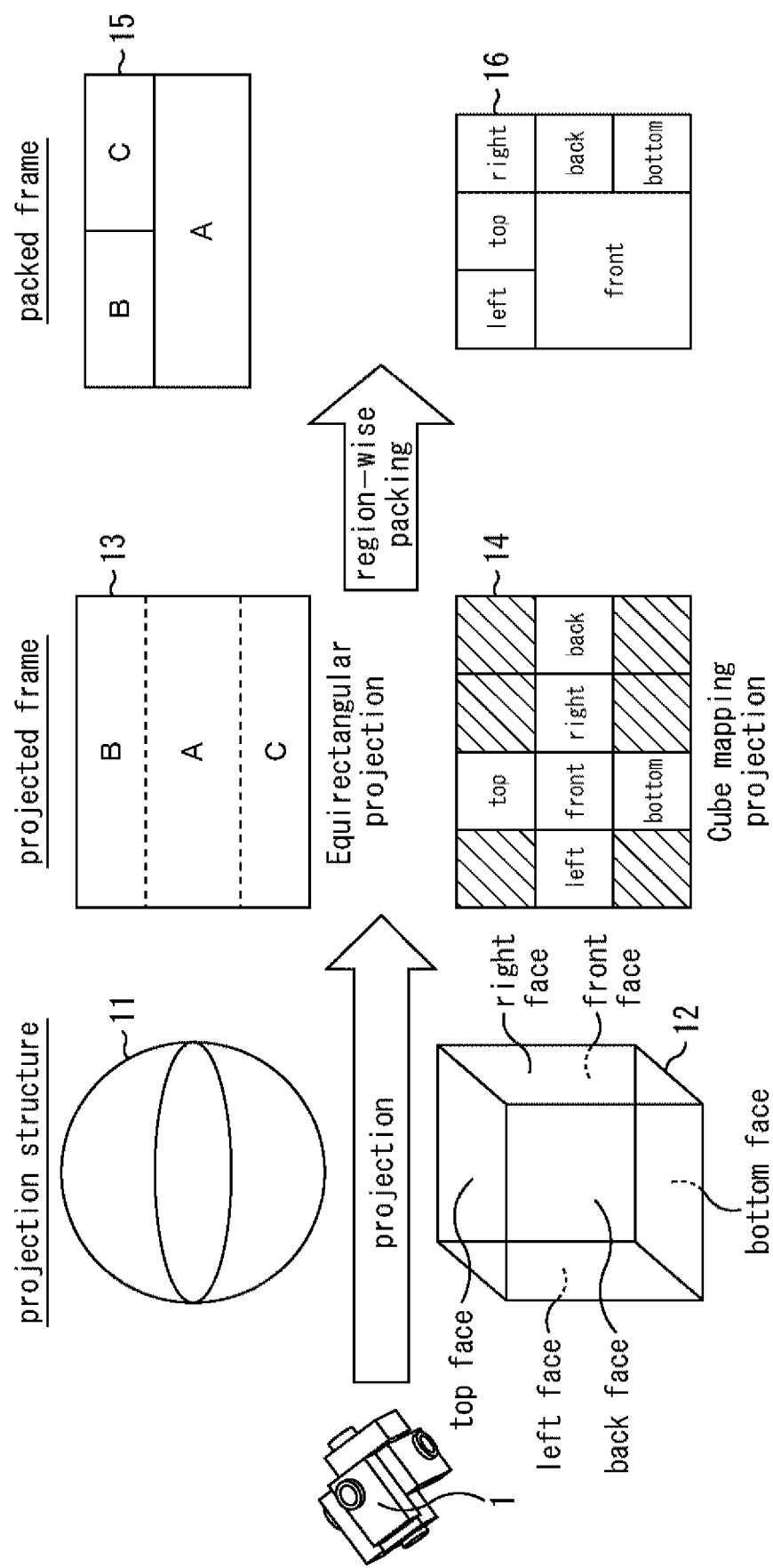
FIG. 1 is an explanatory diagram illustrating a projected frame and a packed frame.

In the present technology, a projected frame and a packed frame of a celestial sphere image are generated. FIG. 1 is an explanatory diagram illustrating a projected frame and a packed frame. As illustrated in FIG. 1, an omnidirectional image (celestial sphere image) is photographed by a camera 1. The celestial sphere image is an image of 360 degrees in up, down, left, and right directions. Note that, hereinafter, in a case in which it is difficult to understand words when the words are written in katakana, the words are described in English.

The celestial sphere image can be projected to a projection structure to obtain a projected frame. Then, by changing a position and a size of the projected frame for each region and disposing and packing the projected frame on a 2-dimensional surface, it is possible to obtain a packed frame. In this way, changing at least one of the position or the size for each region for packing is referred to as region-wise packing. In the packed frame, the projected frame is disposed so that each region is rectangular as a whole. By using the packed frame, it is possible to optimize a transmission capacity by increasing a resolution of a region in which high quality is preferable and decreasing a resolution of a region in which low quality is sufficient.

In the example of FIG. 1, a sphere 11 and a cube 12 are illustrated as projection structures. By projecting the celestial sphere image to the sphere 11 in accordance with equirectangular projection and expressing the sphere 2-dimensionally, it is possible to obtain a projected frame 13. In this example, the projected frame 13 includes a middle region A, a region B located above, and a region C located below.

Then, a packed frame 15 can be obtained by performing region-wise packing on the projected frame 13. In this example, the resolution of the region A is considered to remain unchanged, the region B is disposed on the top left side of the region A, and the region C is disposed on the right side. The resolutions of the regions B and C decrease. Hereinafter, these regions are simply also referred to as regions or region images.

By projecting the celestial sphere image to the cube 12 (performing cube mapping projection) and expressing the celestial sphere image 2-dimensionally, it is possible to obtain a projected frame 14. Images of six faces (regions) including a front face, a right face, a back face, a left face, a top face, and a bottom face of the cube 12 are disposed in the projected frame 14 and include a total of 12, 4×3, regions. Respective region images of the left face (left), the front face (front), the right face (right), and the back face (back) are disposed in four middle regions in sequence from the left side, a region image of the top face (top) is disposed in a region above the front face (front), and a region image of the bottom face (bottom) is disposed in a region below the front face.

By performing region-wise packing on the projected frame 14, it is possible to obtain a packed frame 16. In the example, the resolution of the region image of the front face (front) increases and the resolutions of the other region images remain unchanged. The region image of the face (left) is disposed on the left side of the region image of the front face (front) and the region image of the top face (top) is disposed on the right side thereof. The region images of the right face (right), the back face (back), and the bottom face (bottom) are disposed in sequence from the top on the right side of the region image of the front face (front).

<Margins (FIGS. 2 to 23)>

Figure 2:
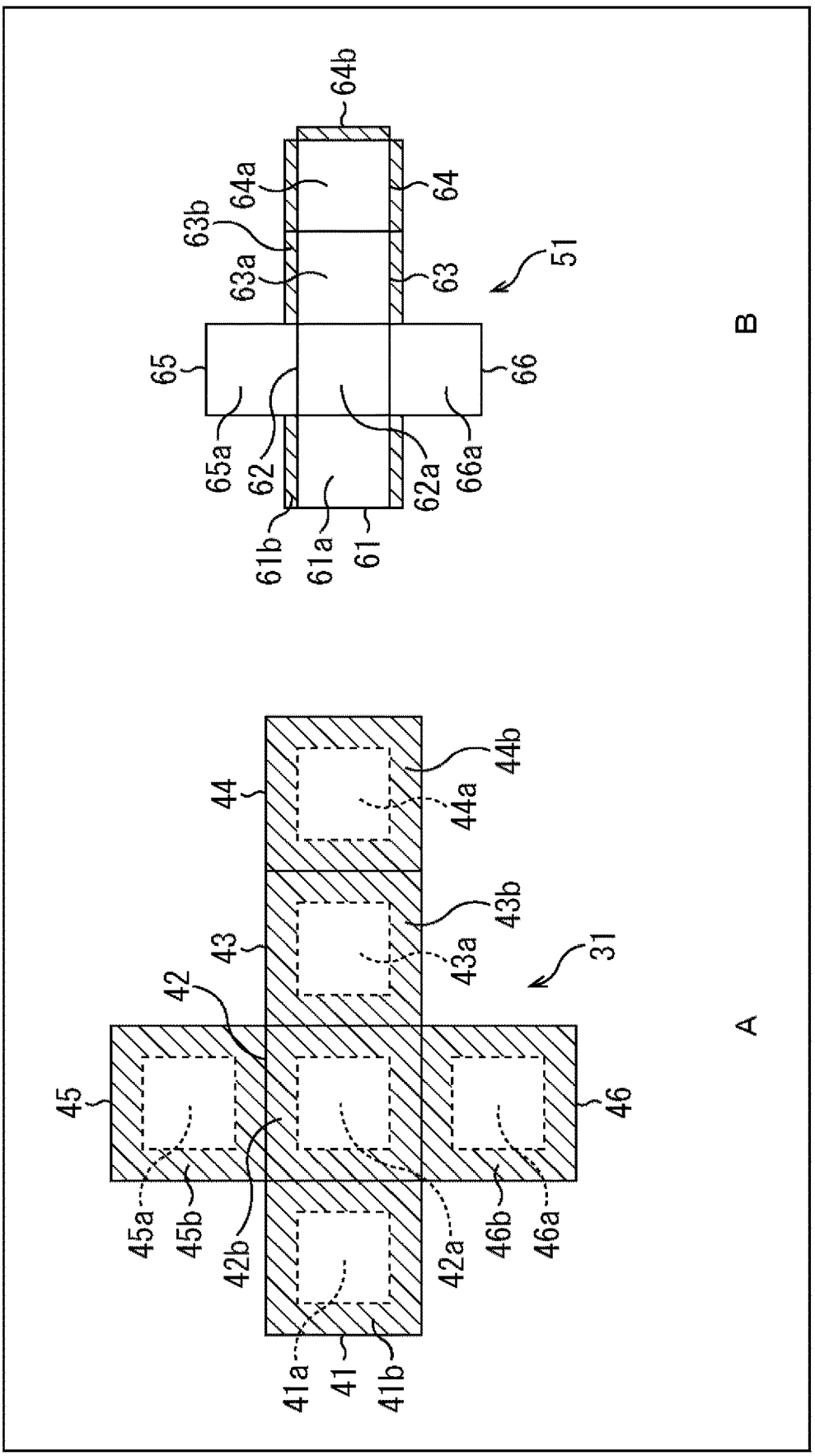
FIG. 2 is a diagram illustrating examples of margins.
Figure 3:
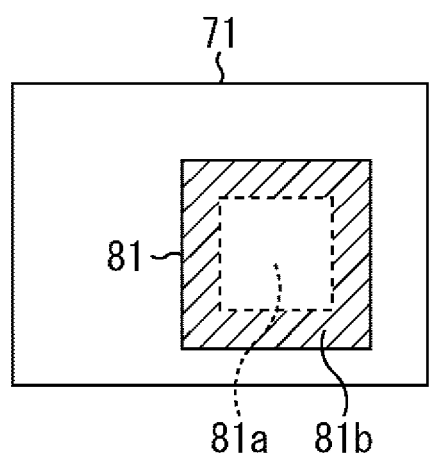
FIG. 3 is a diagram illustrating examples of margins.

Next, margins will be described FIGS. 2 and 3 are diagrams illustrating examples of margins.

FIG. 2 illustrates examples of margins in cube mapping projection. In A of FIG. 2, a region image 41 of the left face (left), a region image 42 of the front face (front), a region image 43 of the right face (right), and a region image 44 of the back face (back) are disposed sequentially from the left in the middle row. In addition, a region image 45 of the top face (top) is disposed above the region image 42 of the front face (front) and a region image 46 of the bottom face is disposed below the region image 42 of the front face (front).

In the example of A of FIG. 2, a whole circumferential margin is formed outside the region of each face. For example, the region image 41 including a margin is formed by an inside region 41a and an outer circumferential margin 41b on the left face and the region image 42 including a margin is formed by an inside region 42a and an outer circumferential margin 42b on the front face. The region image 43 including a margin is formed by an inside region 43a and an outer circumferential margin 43b on the right face and the region image 44 including a margin is formed by an inside region 44a and an outer circumferential margin 44b on the back face. The region image 45 including a margin is formed by an inside region 45a and an outer circumferential margin 45b on the top face and the region image 46 including a margin is formed by an inside region 46a and an outer circumferential margin 46b on the bottom face.

This example is used to suppress deterioration in image quality when texture pixels in face boundaries are complemented at the time of using of a multi-face projection structure.

In the example of B of FIG. 2, a margin is formed on the outside of the region of each face. For example, a region image 61 of the left face (left), a region image 62 of the front face (front), a region image 63 of the right face (right), and a region image 64 of the back face (back) are disposed sequentially from the left in the middle row. In addition, a region image 65 of the top face is disposed above the region image 62 of the front face (front) and a region image 66 of the bottom face is disposed below the region image 62 of the front face (front).

Of these region images, a margin 61b is formed on the upper side and the lower side of the region image 61 and a margin 63b is formed on the upper side and the lower side of the region image 63. A margin 64b is also formed not only on the upper side and the lower side but also on the right side of the region image 64. In the case of this example, the margins 61b, 63b, and 64b are formed outside the region images 61, 63, and 64. Therefore, regions 61a, 63a, and 64a on the inside of the margins are region images.

This example is used to suppress deterioration in image quality occurring when faces not continuous on the projected frame and adjacent in the projection structure are connected. The margins are portions overlapping connection destination regions when the projection structure is formed from the projected frame.

FIG. 3 illustrates an example in which deterioration in image quality of a boundary is suppressed in a case in which a high-resolution layer image (cube mapping projection) overlaps a low-resolution layer image equirectangular projection). For example, this example is an example of a case in which a high-resolution image is superimposed on an entire celestial sphere image with a low resolution in only a specific region near the center of a visual line. A high-resolution layer image 81 overlaps a low-resolution layer image 71. The high-resolution layer image 81 includes an inside region 81a and a margin 81b formed to surround the inside region 81a.

For example, the inside region 81a of the high-resolution layer image and the low-resolution layer image 71 are rendered as they are. The margin 81b of the high-resolution layer image 81 and the region of the low-resolution layer image 71 overlapping the margin 81b are subjected to a blending process (dissolving or the like) to be displayed.

Figure 4:
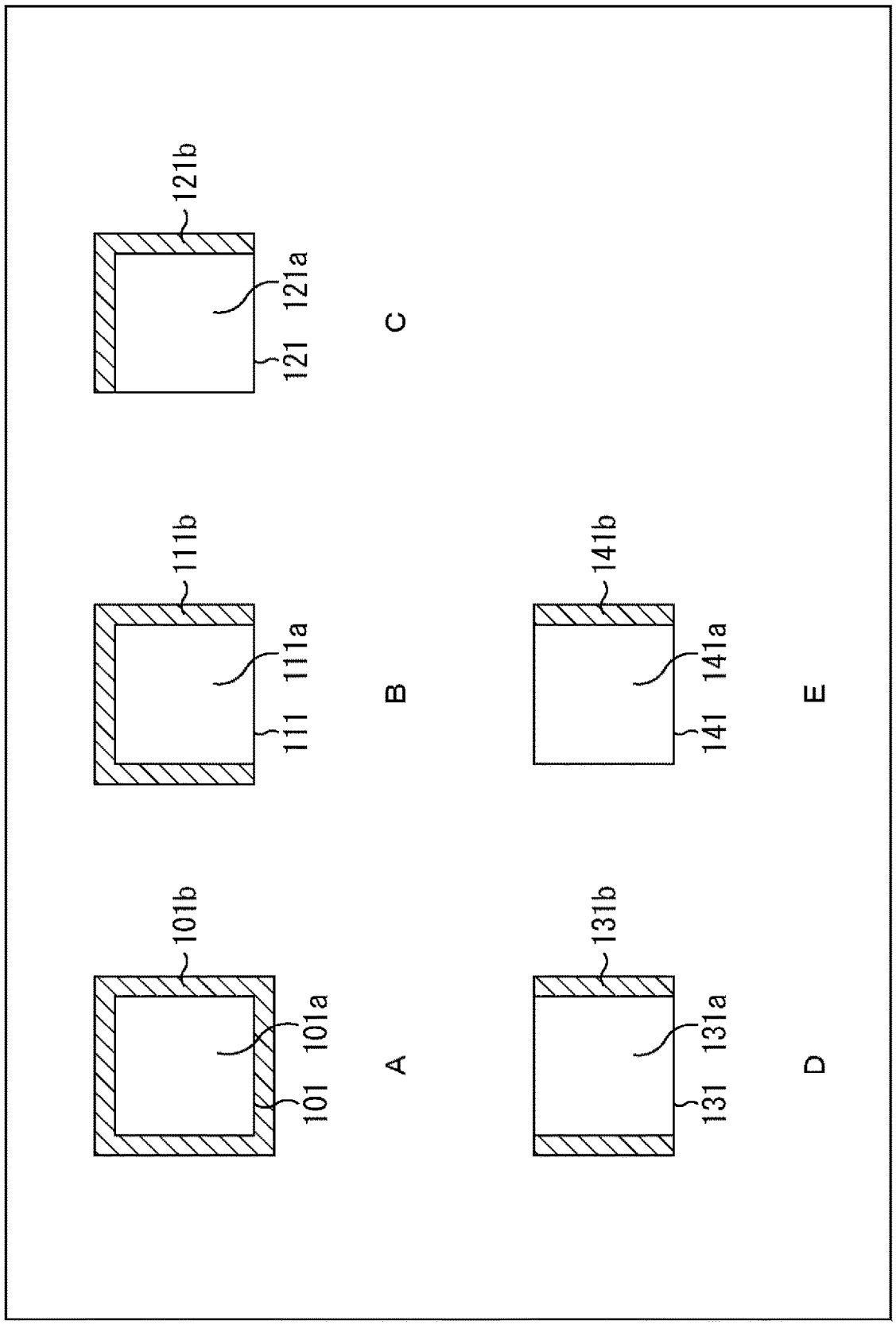
FIG. 4 is a diagram illustrating patterns of margins.

FIG. 4 is a diagram illustrating patterns of margins. The margins of FIG. 4 are considered to be margins of Type 1. In A of FIG. 4, a margin 101b is formed outside along four sides of the region image 101 (an inside region 101a). In B of FIG. 4, a margin 111b is formed outside along the upper side and the right and left sides of the region image 111 and a region Ilia (region 111) is formed inside. In C of FIG. 4, a margin 121b is formed outside along the upper side and the right side of the region image 121 and a region 121a (region 121) is formed inside.

In D of FIG. 4, a margin 131b is formed outside along the left side and the right side of a region image 131 and a region 131a (region 131) is formed inside. In E of FIG. 4, a margin 141b is formed outside along the right side of a region image 141 and a region 141a (region 141) is formed inside. In Pattern 1, a non-formed portion is not provided as in Pattern 2 to be described below.

FIG. 5 is a diagram illustrating patterns of margins. The margins of FIG. 5 are considered to be margins of Type 2. In A of FIG. 5, a margin 161b is formed outside along four sides of a region image 161 and a region 161a (region 161) is formed inside. In the margin 161b, a non-formed portion 161c which is a portion in which the margin 161b is not formed (a deleted portion) is formed in four corners thereof.

In B of FIG. 5, a margin 171b is formed along the upper side and the right and left sides of a region image 171 and a region 171a (region 171) is formed inside. A non-formed portion 171c which is a portion in which the margin 171b is not formed (a deleted portion) is formed in two corners of the margin 171b.

In C of FIG. 5, a margin 181b is formed outside along the upper side and the right side of a region image 181 and a region 181a (region 181) is formed inside. A non-formed portion 181c which is a portion in which the margin 181b is not formed (a deleted portion) is formed in one corner of the margin 181b.

In this way, the margin of Type 2 has a non-formed portion in corners of the adjacent sides (does not have corners). In contrast, the margin of Type 1 does not has a non-formed portion (has corners). For the margin of Type 1, the region with the margin is delivered with information regarding a width and a height. For the margin of Type 2, information regarding a width and a height is delivered as in the margin of Type 1, but the corners (the non-formed portions) of the margin are processed as a region in which the margin is deleted in the region with the margin.

According to the present technology, the disposition of the various margins in FIGS. 4 and 5 is delivered using RegionMappingBox by the concepts of a projected frame and a packed frame. All indicates the regions with no margin and the regions with the margins by positions and sizes and a client can acquire any region easily. In addition, information indicating whether or not a celestial sphere image has a margin is delivered with margin_flag.

RegionMappingBox is disposed below, for example, Scheme Information Box ('schr') defined by ISOBMFF at the time of SchemeType='rmap,' but can also be disposed in another location. Hereinafter, an example of RegionMappingBox will be described.

FIG. 6 is a diagram illustrating a configuration example of RegionMappingBox. FIGS. 7 and 8 are explanatory diagrams illustrating fields of RegionMappingBox.

FIG. 6 illustrates a configuration of RegionMappingBox in a case in which region information (region information regarding a projected frame) a projection structure is indicated by a spherical coordinate system. The centers of regions with a margin and with no margin in the projection structure are shown commonly to center_yaw and center_pitch. Presence or absence of the margin and a type of margin can be switched for each region in accordance with region_margin_type.

In the example of FIG. 6, projection_format, packing_flag, FOV_flag, margin_flag, and num_regions are described in RegionMappingBox. Here, projection_format represents a projection type, Value 0 thereof means equirectangular projection, and Value 1 thereof means cube mapping projection. Here, packing_flag represents whether or not the region-wise packing is used, Value 0 thereof means non-use of the region-wise packing, and Value 1 thereof means use of the region-wise packing.

FOV_flag indicates a standard of angle information of object_width and object_height, Value 0 thereof means the surface of a sphere, and Value 1 thereof means the surface of perspective projection. As will be described below with reference to FIG. 9, object_width represents a width (angle) of a region in a projection structure and object_height represents a height (angle) of a region in the projection structure.

Here, margin_flag represents whether or not a celestial sphere image includes a region with a margin, Value 0 thereof means only a region with no margin, and Value 1 thereof a region with a margin. In addition, num_regions represents the number of regions of a packed frame.

In RegionMappingBox, center_yaw, center_pitch, object_width, and object_height are further described. These are region information in a spherical coordinate system of a region of a projected frame. Here, center_yaw represents a yaw of a region center in the projection structure and is common to a region with a margin and a region with no margin. In addition, center_pitch represents a pitch of the region center in the projection structure and is common to a region with a margin and a region with no margin.

In a case in which a value of packing_flag is true (Value 1), rect_width, rect _height, rect_left, and rect_top are described. These are region information in a 2-dimensional coordinate system of a region of the packed frame. Here, rect_width represents the width of a region with no margin in the packed frame and rect_height represents the height of the region with no margin in the packed frame. In addition, rect_left and rect_top present x and y coordinates of the region with no margin in the packed frame, respectively. These will be further described later with reference to FIG. 9.

In a case in which a value of margin_flag is true (Value 1), region_margin_type is described. Here, region_margin _type represents a type of margin of a region, Value 0 thereof means a region with no margin, Value 1 means a region with a margin (with a corner of the margin), and Value 2 means a region with a margin (with no corner of the margin).

Further, in a case in which if(region_margin_type=!0), that is, region_margin_type, is not 0 (the case of Value 1 or Value 2), that is, a case in which a region is a region with a margin, object_with_margin_width, object_with_margin_height, width_margin_assignment, and height_margin_assignment are described. These are region information in the spherical coordinate system of a margin of the projected frame.

Here, object_with_margin_width represents a width (angle) of a region including a margin in the projection structure. This is a value in a case in which a margin is equally allocated. In addition, object_with_margin_height represents a height (angle) of the region including the margin in the projection structure. This a value in a case in which the margin is equally allocated.

Here, width_margin_assignment represents allocation of the margin in the width direction of the region. Value 0 thereof means equal allocation on both sides or non-margin, Value 1 means only a margin on the right side and deletion of a margin on the left side, and Value 2 means only a margin on the left side and deletion of a margin on the right side. In addition, height_margin_assignment represents allocation of a margin in the height direction of a region. Value 0 means equal allocation on both sides or non-margin and Value 1 means only a margin on the upper side and deletion of a margin on the lower side. Value 2 means only a margin on the lower side and deletion of a margin on the upper side.

Further, in a case in which packing_flag is true, that is, the case of packing_flag=1 (the region-wise packing is used), rect_with_margin_width, rect_with_margin_height, rect_with_margin_left, and rect_with_margin_top are described. These are region information in a 2-dimensional coordinate system of a margin of the packed frame. Here, rect_with_margin_width represents a width of a region including a margin in the packed frame and rect_with_margin_height represents a height of the region including the margin in the packed frame. In addition, rect_with_margin_left and rect_with_margin_top represent x and y coordinates of a top left corner of the region including the margin in the packed frame, respectively.

The fields of RegionMappingBox have been described above with FIGS. 7 and 8.

Figure 9:
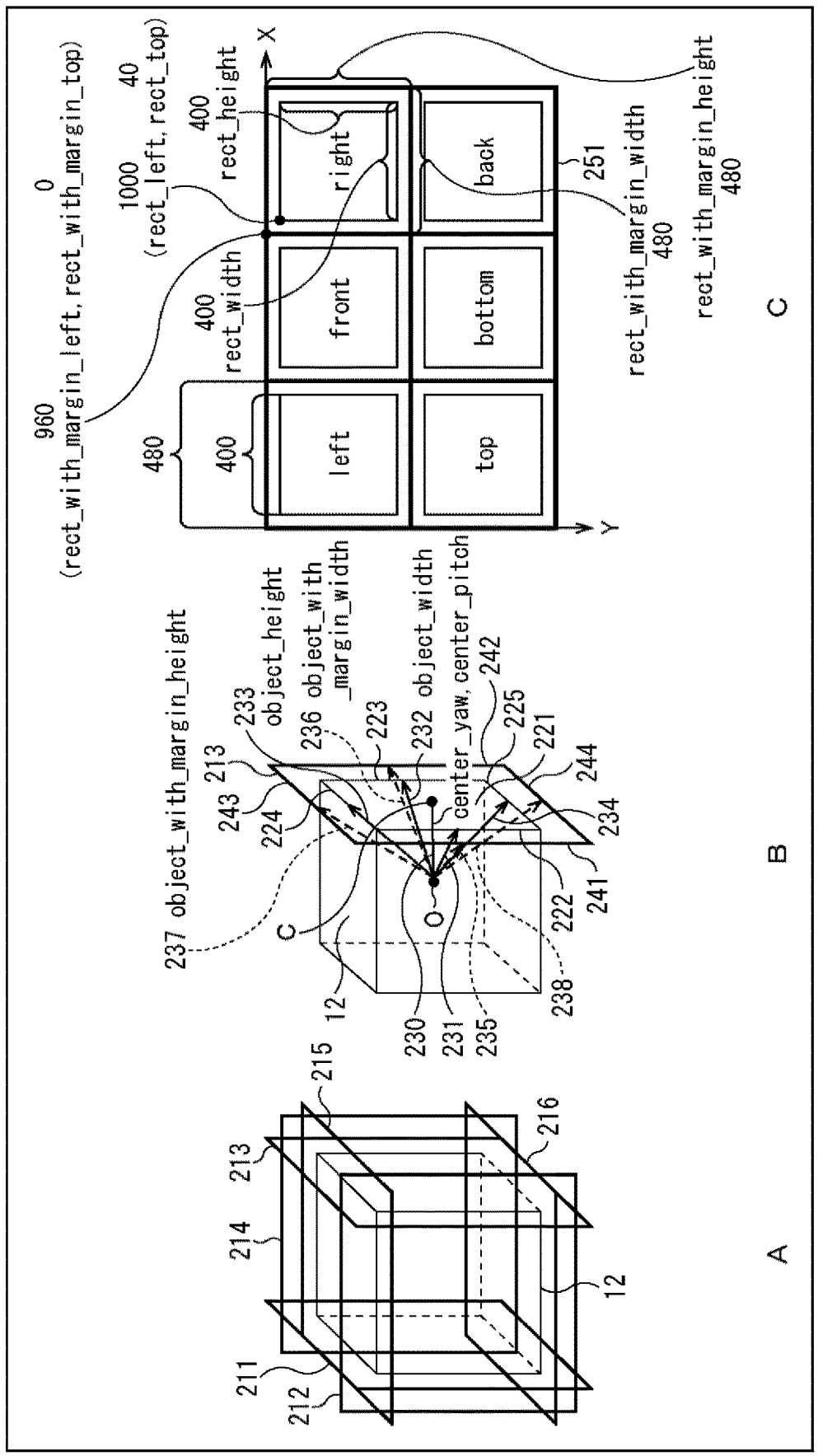
FIG. 9 is an explanatory diagram illustrating margins of cube matching projection.

Next, delivery of the margins of the cube mapping projection using RegionMappingBox will be described with reference to FIGS. 9 and 10. FIG. 9 is an explanatory diagram illustrating margins of the cube matching projection. FIG. 10 is an explanatory diagram illustrating fields at the time of the cube matching projection.

As illustrated in A of FIG. 9, portions from the sides of the left face, the back face, the right face, and the front face of a cube 12 which is a projection structure to ranges indicated by outer sides 211, 212, 213, and 214 are considered to be margins. Similarly, portions to ranges indicated by outer sides 215 and 216 of the top face and the bottom face are considered to be margins.

B of FIG. 9 illustrates a right face 221 among the faces. Here, xyz coordinates in which a center O of the cube 12 which is the projection structure is set as the origin (an axis in a direction perpendicular to the front face is the x axis, an axis in a direction perpendicular to the right face is the y axis, and an axis in a direction perpendicular to the top face is the z axis) are assumed. A line connecting the center O to a center C of the right face 221 is a line 230 and an angle formed between a line obtained by projecting the line 230 to the xy coordinate plane (which is the same as the line 230 in the case of B of FIG. 9) and the x axis is center_yaw (−90 degrees in the case of B of FIG. 9). An angle of the line 230 with respect to the xy plane is center_pitch (0 degrees in the case of B of FIG. 9).

An angle formed between a perpendicular line 236 to the left side 223 of the right face 221 from the center O and a perpendicular line 231 to a right side 222 is object_width and an angle formed between a perpendicular line 233 to an upper side 224 and a perpendicular line 234 to a lower side 225 is object_height.

For a margin, similarly, an angle formed between a perpendicular line 236 drawn from the center O to a left side 242 of the margin 213 and a perpendicular line 235 drawn to a right side 241 is object_with_margin_width and an angle formed between a perpendicular line 237 drawn to an upper side 243 and a perpendicular line 238 drawn to a lower side 244 is object_with_margin_height.

C of FIG. 9 illustrates a packed frame 251. In this configuration example, region images of the left, front, and right faces are disposed sequentially from the left side on the upper stage and region images of the top, bottom, and back faces are disposed sequentially from the left on the lower stage. As a whole, the packed frame 251 includes 3×2 region images. The size of each region image is considered to have 400×400 pixels and a margin with 40 pixels is formed outside four sides. Accordingly, the size of the region image including the margin is 480×480 pixels.

Accordingly, rect_with_margin_left of the right face including the margin is 960, rect_with_margin_top is 0 and both rect_with_margin_width and rect_with_margin_height are 480. In addition, rect_left of the image region is 1000, rect_top is 40, and both rect_width and rect_height are 400.

As illustrated in FIG. 9, a specific value of each field of RegionMappingBox by the cube mapping projection represented with a spherical coordinate system is illustrated in FIG. 10. Here, projection_format is 1 (the cube mapping projection), packing_flag is 1 (the region-wide packing is used), margin_flag is 1 (including a region with a margin), num_regions (the number of regions of the packed frame) is 6, and FOV_flag is 1 (a surface of projective projection). In addition, center_yaw, center_pitch, object_width, and object_height of the right face are −90, 0, 90, and 90, respectively.

In addition, rect_width, rect_height, rect_left, and rect_top of the right face are 400, 400, 1000, and 40, respectively. In addition, region_margin_type is 1 (a region with a margin (no corner of a margin)), and object_with_margin_width and object_with_margin_height of the right face including the margin are 100 and 100, respectively. In addition, each of width_margin_assignment and height_margin_assignment is 0 (equal allocation on both sides (or no margin)). In addition, rect_with_margin_width, rect_with_margin_height, rect_with_margin_left, and rect_with_margin_top of the right face including the margin are 480, 480, 960, and 0, respectively.

The value of each field is collectively written in FIG. 10. Here, projection_format is 1, packing_flag is 1, margin_flag is 1, num_regions is 6, and FOV_flag is 1. In addition, center_yaw, center_pitch, object_width, and object_height of the right face are −90, 0, 90, and 90, respectively. In addition, rect_width, rect_height, rect_left, and rect_top of the right face are 400, 400, 1000, and 40, respectively.

In addition, region_margin_type is 1, and object_with_margin_width and object_with_margin_height of the region including the margin of the right face are 100 and 100, respectively. In addition, both width_margin_assignment and height_margin_assignment are 0. In addition, rect_with_margin_width, rect_with_margin_height, rect_with_margin_left, and rect_with_margin_top of a region including the margin of the right face are 480, 480, 960, and 0, respectively.

In this way, since the margin of each region (cube face) is of Type 1, region_margin_type=1 is delivered. In addition, because of equal disposition in both width and height directions of the region including each margin, width_margin_assignment and height_margin_assignment are delivered as 0 together.

Figure 11:
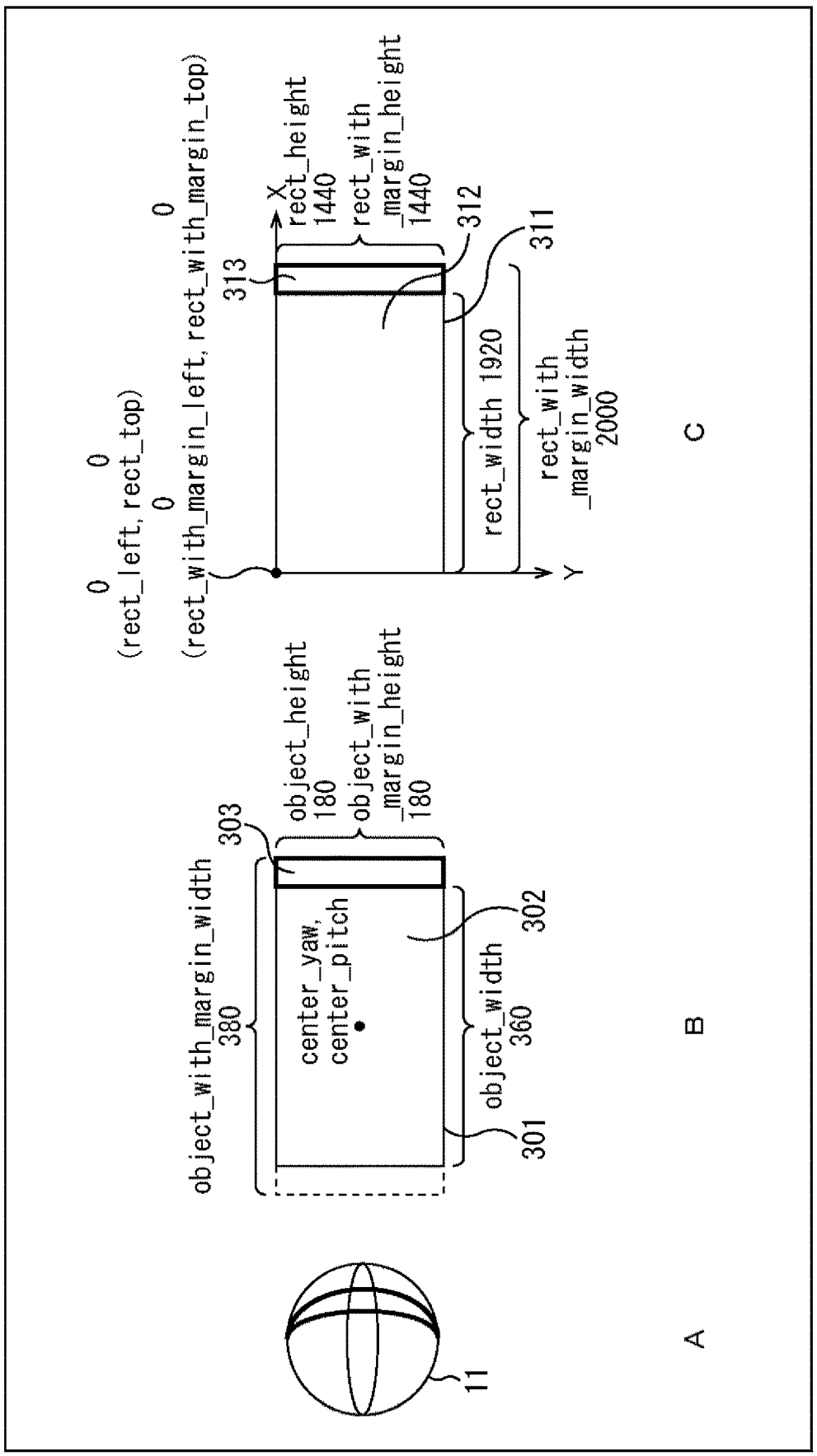
FIG. 11 is an explanatory diagram illustrating margins of equirectangular projection.

Next, an example in which a margin of equirectangular projection is delivered using RegionMappingBox will be described with reference to FIGS. 11 and 12. FIG. 11 is an explanatory diagram illustrating margins of equirectangular projection. FIG. 12 is an explanatory diagram illustrating fields at the time of the equirectangular projection.

In this example, for convenience, region information is indicated using a projected frame. In A of FIG. 11, a sphere 11 is illustrated as a projection structure. In B of FIG. 11, a projected frame 301 obtained by the projection is illustrated. A margin 303 is formed on the right side of an image region (inside region) 302. However, for convenience, the margin 303 is considered to be formed equally to the right and left of the region image 302. Here, object_with_margin_width is 380 and object_with_margin_height is 180. In addition, object_width is 360 and object_height is 180. In addition, width_margin_assignment is considered to be 1 (only the right margin: the left margin is deleted).

In C of FIG. 11, a packed frame 311 is illustrated. A margin 313 is formed on the right side of an image region (inside region) 312. Here, rect_width is 1920 and rect_height is 1440. In addition, rect_with_margin_width is 2000 and rect_with_margin_height is 1440. In addition, rect_left and rect_top, rect_with_margin_left and rect_with_margin_top are all 0 and 0.

The value of each field is collectively written in FIG. 12. Here, projection_format is 0 (equirectangular projection), packing_flag is 1, margin_flag is 1 (including a region with a margin), num_regions is 6, and FOV_flag is 0 (a surface of a sphere). In addition, center_yaw, center_pitch, object_width, and object_height are 0, 0, 360, and 180, respectively. In addition, rect_width, rect_height, rect_left, and rect_top are 1920, 1440, 0, and 0, respectively.

In addition, region_margin_type is 1 (a region with a margin (no corner of a margin)), and object_with_margin_width and object_with_margin_height are 380 and 180, respectively. In addition, width_margin_assignment is 1 (only the right margin: the left margin is deleted) and height_margin_assignment are 0 (equal allocation on both sides (or no margin)). In addition, rect_with_margin_width, rect_with_margin_height, rect_with_margin_left, and rect_with_margin_top of a region including the margin of the right face are 2000, 1440, 0, and 0, respectively.

In this way, for the width of the region including the margin, a value in a case in which the margin is equally allocated is delivered as object_with_margin_width in the projection structure. Since a type of margin of the region is 1, region_margin_type=1 is delivered. In addition, since a margin of the region is on the right side in the width direction and is not in the height direction, width_margin_assignment=1 and height_margin_assignment=0 are delivered.

Next, a modification example of RegionMappingBox of FIG. 6 will be described with reference to FIG. 13. FIG. 13 is a diagram illustrating a configuration example of RegionMappingBox.

In the example of FIG. 13, margin allocation information (width_margin_assignment and height_margin_assignment) of information regarding a region with a margin in the projection structure described in the example of FIG. 6 is omitted. Semantics of fields other than the omitted fields is similar to the case of FIG. 6. That is, in the example of FIG. 13, the information regarding the region with the margin in the projection structure is regarded to have a whole circumferential equal margin for delivery. In this case, a maximum margin width applied to a target region is set as an equal margin width. Alternatively, the margin width may be set as a margin width equal in the up, down, right, and left directions. Margin allocation of a region is delivered with region information (rect_with_margin_width, rect_with_margin_height, rect_with_margin_left, and rect_with_margin_top) in the packed frame.

Note that with the exception of the examples of FIGS. 4 and 5, for example, delivery can be performed with RegionMappingBox even in a case in which a margin is on the whole circumference of a region and allocation is unequal in the up, down, right, and left directions of the region.

An example of FIG. 14 is also a modification example of RegionMappingBox of FIG. 6. FIG. 14 is a diagram illustrating a configuration example of RegionMappingBox. The example of FIG. 14 is an example in which information with a region with a margin is not delivered in a projection structure. That is, object_width_margin_width, object_with_margin_height, width_margin_assignment, and height_margin_assignment in the example in FIG. 6 are omitted. Semantics of the fields other than the omitted fields is similar to the case in FIG. 6.

Further, a modification example of RegionMappingBox of FIG. 6 will be described with reference to FIG. 15. FIG. 15 is a diagram illustrating a configuration example of RegionMappingBox. In this example, in the case of region_margin_type=1, that is, a case in which there is a corner of a margin (if (region_margin_type=1)), the region with the margin is delivered with both the projection structure (object_width_margin_width, object_with_margin_height, width_margin_assignment, and height_margin_assignment) and the packed frame (rect_with_margin_width, rect_with_margin_height, rect_with_margin_left, and rect_with_margin_top). In other cases, the region with the margin is delivered with only the packed frame. Semantics of the other fields is similar to the case in FIG. 6.

Next, an example in which region information in a projected frame is represented in a 2-dimensional coordinate system will be described with reference to FIGS. 16 and 17. FIG. 16 is a diagram illustrating a configuration example of RegionMappingBox. FIG. 17 is an explanatory diagram illustrating fields of RegionMappingBox.

In the example of FIG. 16, information regarding regions with no margin and with a margin in the projected frame and the packed frame is indicated in a 2-dimensional coordinate system in accordance with a pixel position and a region size of the top left of each region. That is, pf_region_width, pf_region_height, pf_region_left, and pf_region_top are described instead of center_yaw, center_pitch, object_width, and object_height in FIG. 6. In addition, pf_region_with_margin_width, pf_region_with_margin_height, pf_region_with_margin_left, and pf_region_with_margin_top are described instead of object_with_margin_width, object_with_margin_height, width_margin_assignment, and height_margin_assignment.

In FIG. 17, the fields of FIG. 16 are collectively written. Fields not written in FIGS. 7 and 8 will be described below. Here, pf_region_width and pf_region_height represent the width and the height of a region with no margin (a region including no margin) in the projected frame, respectively, and pf_region_left and pf_region_top represent x and y coordinates of the region with no margin in the projected frame, respectively.

In addition, pf_region_with_margin_width and pf_region_with_margin_height represent the width and the height of a region including a margin in the projected frame, respectively. In addition, the pf_region_with_margin_left and pf_region_with_margin_top represent the x and y coordinates of the region including the margin in the projected frame, respectively.

Figure 18:
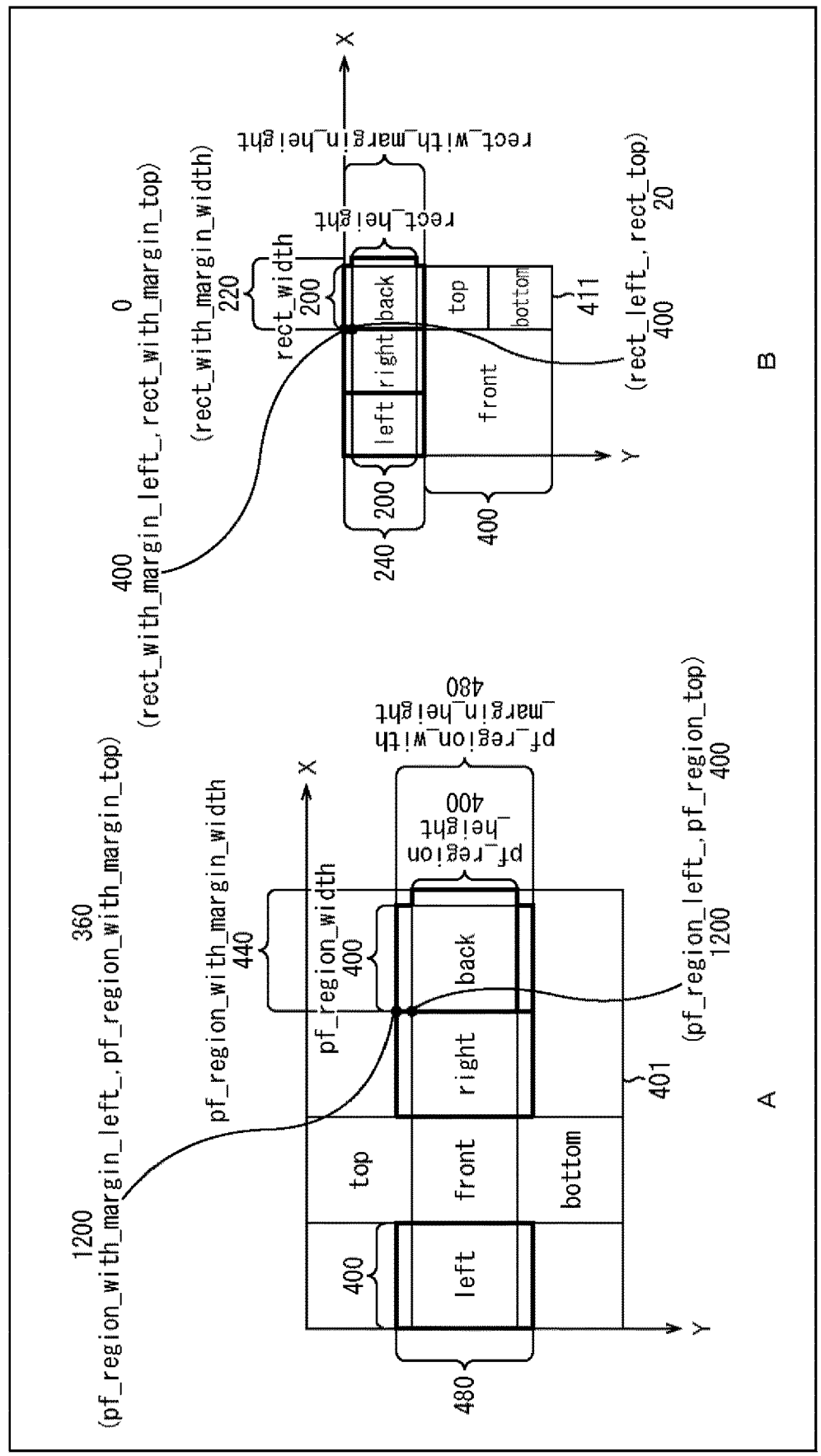
FIG. 18 is an explanatory diagram illustrating margins of the cube matching projection.

Next, an example of delivery of a margin of a cube mapping projection using RegionMappingBox will be described with reference to FIGS. 18 and 19. FIG. 18 is an explanatory diagram illustrating margins of the cube matching projection. FIG. 19 is an explanatory diagram illustrating fields at the time of the cube matching projection.

In A of FIG. 18, a projected frame 401 is illustrated. Region images of the left, front, right, and back faces are disposed sequentially from the left in the middle row, a region image of the top face is disposed above the front face, and a region image of the bottom face is disposed below the front face. An intersection point of a line extend to the left of the drawing from the upper side of the top face and a line extended to the upper of the drawing from the left side of t eft face is set as the origin of xy coordinates.

The region image of each face have 400×400 pixels. A margin is formed with a width of 40 pixels on each of the upper side and the lower side of the left face, the right face, and the back face. In addition, a margin is also formed with a width of 40 pixels on the right side of the back face. The margin is a margin of Type 2. Accordingly, in the case of focus on the back face, pf_region_left and pf_region_top are 1200 and 400, respectively. In addition, both pf_region_width and pf_region_height are 400.

For the margin, pf_region_margin_left and pf_region_margin_top are 1200 and 360. In addition, pf_region_with_margin_width and pf_region_with_margin_height are 440 and 480.

In B of FIG. 18, a packed frame 411 generated from the projected frame 401 in A of FIG. 18 is illustrated. A resolution of the region image of the front face (front) is considered to be (400×400) as it stands and resolutions of the other region images are reduced to ½ (200×200) horizontally and vertically. Since the width of the margin is reduced to ½ (20 pixels), a margin is disposed with a width of 20 pixels on each of the upper side and the lower side of the left face (left), the right face (right), and the back face (back). In addition, on the right side of the back face, a margin is also disposed with a width of 20 pixels. The margin is a margin of Type 2.

A region image of the left face (left) with a margin is disposed on the upper left side of the region image of the front face (front) and a region image of the right face (right) with a margin is disposed on the right side of the region image of the front face (front). Region images of the top face (top) and the bottom face (bottom) are disposed sequentially from the upper side on the right side of the region image of the front face (front). A region image of the back face (back) with a margin is disposed above the region image of the top face (top) (on the right side of the region image of the right face right)).

In FIG. 19, information regarding the projected frame 401 and the packed frame 411 by the cube mapping projection illustrated in FIG. 18 is described. Here, projection_format is 1 (the cube mapping projection), packing_flag is 1 (the region-wise packing), margin_flag is 1 (including a region with a margin), and num_regions is 6. In addition, pf_region_width, pf_region_height, pf_region_left, and pf_region_top of the back face are 400, 400, 1200, and 400, respectively. In addition, rect_width, rect_height, rect_left, and rect_top of the back face are 200, 200, 400, and 20, respectively.

In addition, region_margin_type is 2 (a region with a margin (no corner of a margin)), and pf_region_with_margin_width, pf_region_with_margin_height, pf_region_with_margin_left, and pf_region_with_margin_top of the back face are 400, 480, 1200, and 360, respectively. In addition, rect_with_margin_width, rect_with_margin_height, rect_with_margin_left, and rect_with_margin_top of the back face are 220, 240, 400, and 0, respectively.

In this way, a resolution of the front face in the packed frame remains unchanged and the resolutions of the other faces are half in the horizontal and vertical directions. Since the margin of the back face is of Type 2 with no corner, region_margin_type=2 is delivered. The margin disposition of the regions is explicitly expressed as the width, height, top, and left of the regions in both the projected frame and the packed frame.

In a case in which chroma sampling is 4:2:2 or 4:2:0, a margin width is set to the number of pixels of a multiple of 2 in consideration of color difference signal decimation so that an encoding process and a region cutting process can be facilitated.

In addition, by setting the margin width to the number of pixels of a multiple of 8 or 16, it is possible to enhance affinity with a block size at the time of encoding, and thus an encoding process and a region cutting process can be facilitated.

The present technology can be applied not only to the cube mapping projection or the equirectangular projection but also on other projection types (for example, truncated square pyramid, a cylinder, and the like).

The example in which only the margin of the rectangular region has been described above, but a similar method can also be applied to other shapes (for example, a triangle, a trapezoid, a circle, or the like). A margin of a triangular region will be described with reference to FIGS. 20 to 22.

Figure 20:
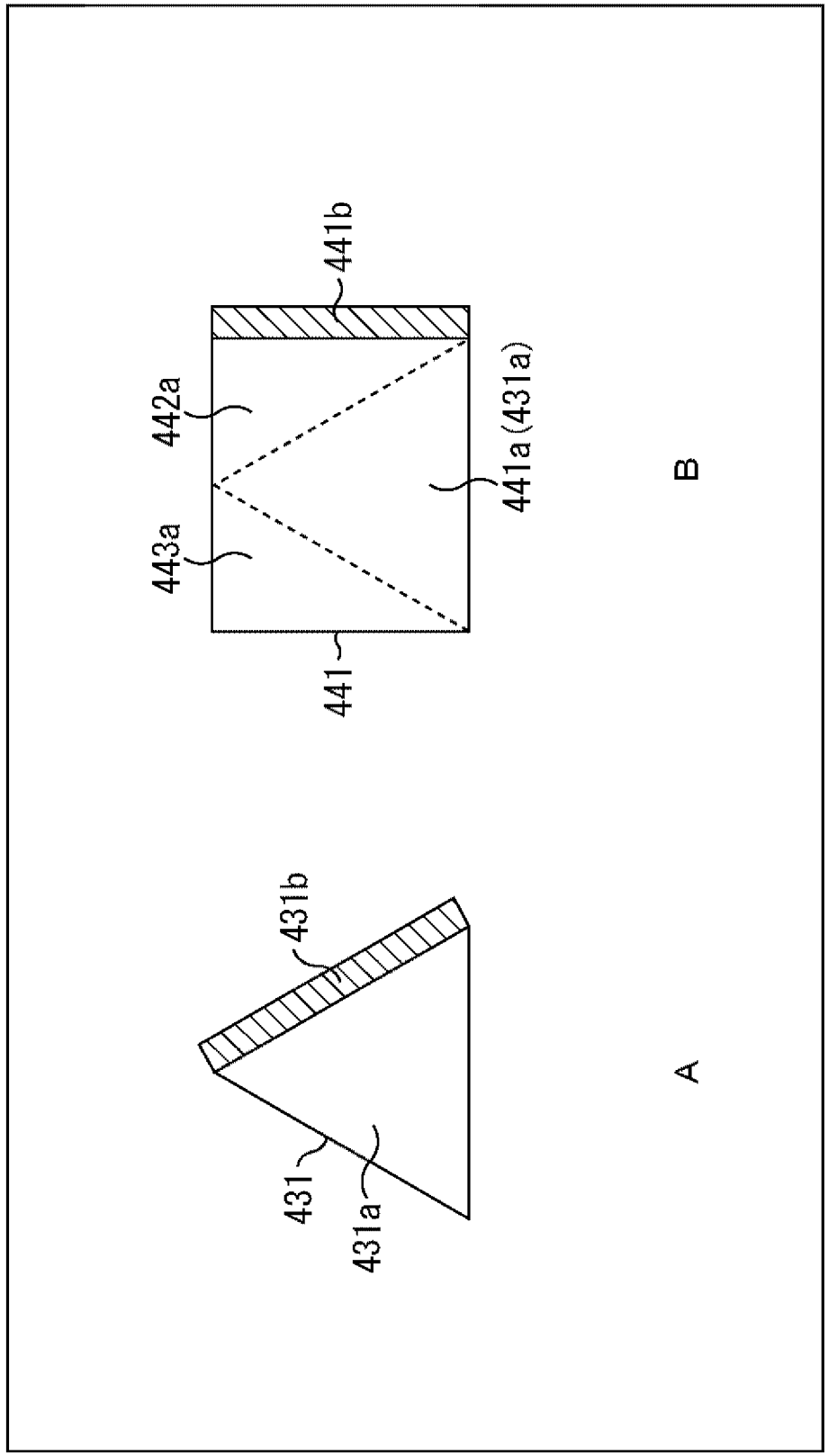
FIG. 20 is diagram illustrating examples of margin disposition.
Figure 21:
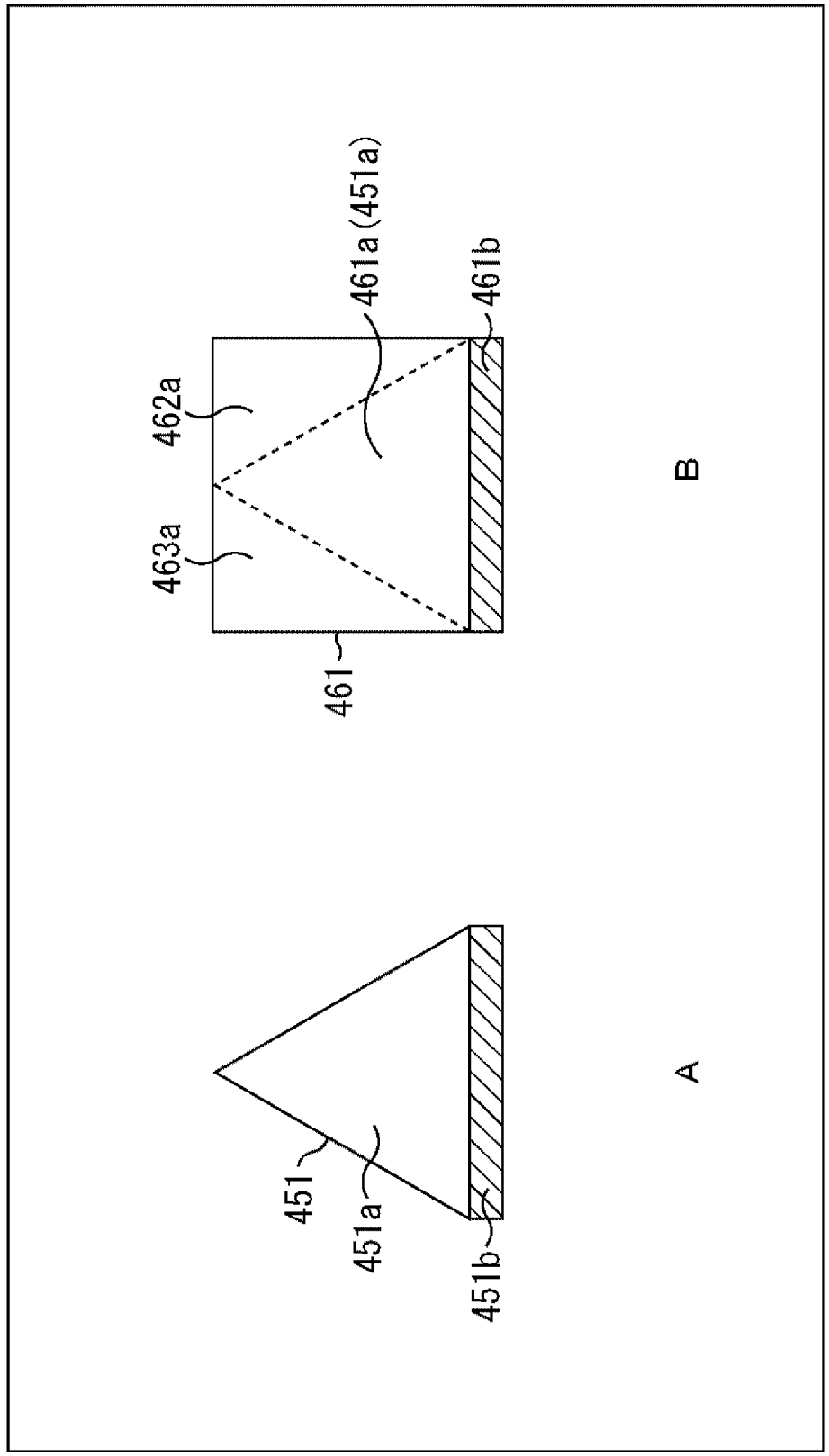
FIG. 21 is diagram illustrating examples of margin disposition.
Figure 22:
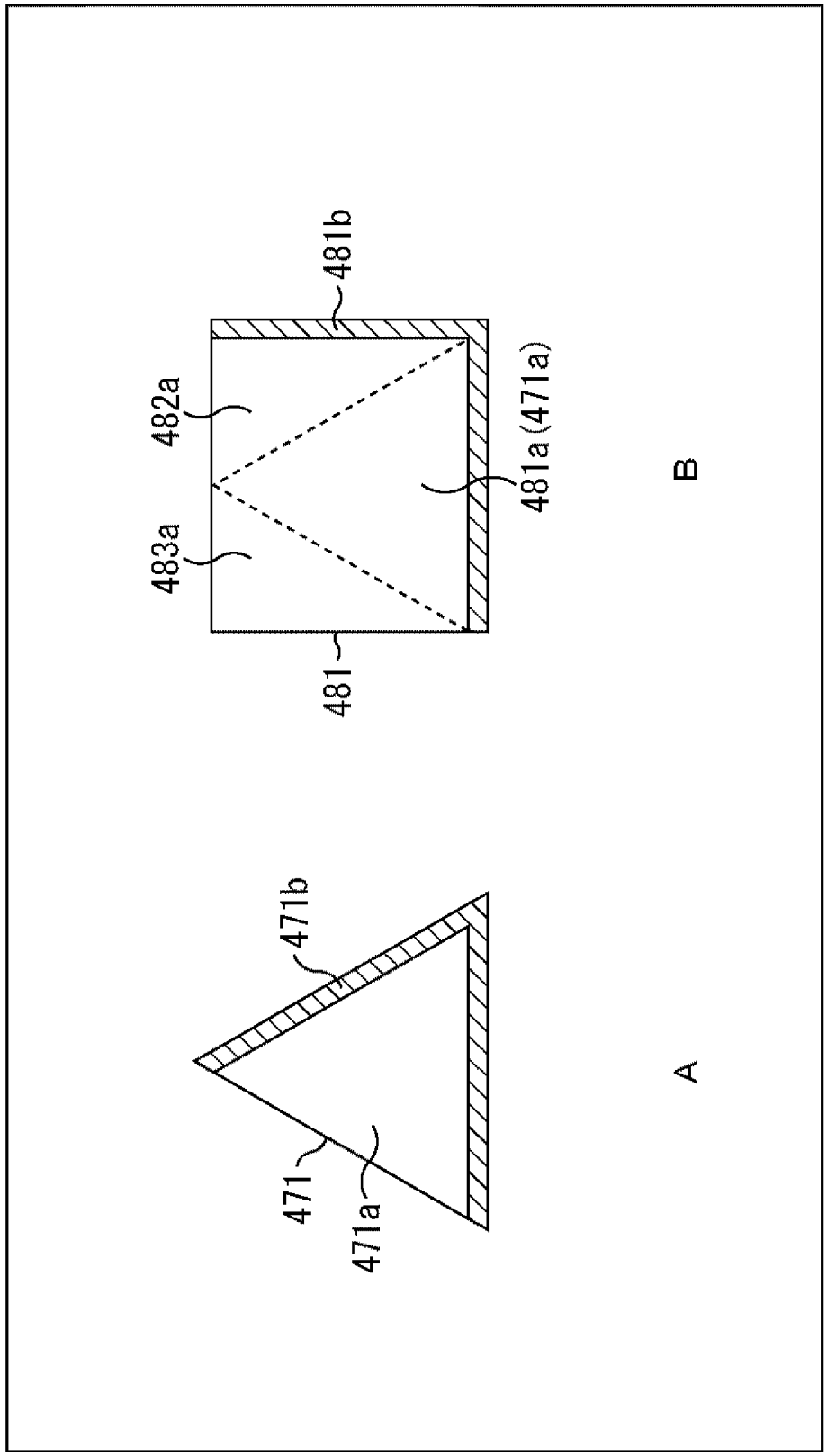
FIG. 22 is diagram illustrating examples of margin disposition.

FIGS. 20 to 22 are diagrams illustrating examples of each margin disposition. In A of FIG. 20, a region image 431 is formed in a triangular shape and a margin 431*b* is formed outside a right side of an inside region 431*a* in the drawing. In this case, as illustrated in B of FIG. 20, a region image 441 is formed by combining other triangular regions 442*a* and 443*a* on two sides of a triangular region 441*a* corresponding to the region 431*a* to form a rectangle as whole.

The region image 441 is a rectangular region that has sides with the same length as the bottom side of the triangular region image 431 and sides with the same length as the height of the triangular region image 431. In addition, a margin 441*b* is disposed on one right side of the rectangular region image 441. The rectangular region image 441 is substituted with the triangular region image 431 to be delivered.

In A of FIG. 21, a region image 451 is formed in a triangular shape and a margin 451*b* is formed outside the bottom side of an inside region 451*a*. In this case, as illustrated in B of FIG. 21, a region image 461 is formed by combining other triangular regions 462*a* and 463*a* on two sides of a triangular region 461*a* corresponding to the region 451*a* to form a rectangle as whole.

The region image 461 is a rectangular region that has sides with the same length as the bottom side of the triangular region image 451 and sides with the same length as the height of the triangular region image 451. In addition, a margin 461*b* is disposed on the bottom side of the rectangular region image 461. The rectangular region image 461 is substituted with the triangular region image 451 to be delivered.

In A of FIG. 22, a region image 471 is formed in a triangular shape and a margin 471b is formed outside the right side and the bottom side of an inside region 471a. In this case, as illustrated in B of FIG. 22, a region image 481 is formed by combining other triangular regions 482a and 483a on two sides of a triangular region 481a corresponding to the region 471a to form a rectangle as whole.

The region image 481 is a rectangular region that has sides with the same length as the bottom side of the triangular region image 471 and sides with the same length as the height of the triangular region image 471. In addition, a margin 481b is disposed on the right side and the bottom side of the rectangular region image 481. The rectangular region image 481 is substituted with the triangular region image 471 to be delivered.

The example of ISBMFF has been described above, but delivery can also be performed using MPEG-DASH (ISO/IEC 23009-1). Next, an application example to DASH will be described with reference to FIG. 23. FIG. 23 is a diagram illustrating an example of an MPD file to which DASH is applied.

In the MPD file of FIG. 23, segment files of an image stream within a time range corresponding to period elements are each grouped to one group and the period elements include two adaptation set element (AdaptationSet).

In each AdaptationSet, a celestial sphere image is indicated by cube projection mapping in accordance with value="cube" of EssentialProperty of schemeIdUri="urn: mpeg: dash: vr: ProjectionType." In addition, whether or not a margin is included in a region of a celestial sphere image (whether a value is 0 or 1) is delivered with SupplementalProperty of schemeIdUri="um: mpeg: dash: vr: margin". The value in SupplmentalProperty has the same semantics as margin_flag described above.

A DASH client can select, acquire, and reproduce AdaptationSet and Representation with a margin, for example, in a case in which DASH client performs a process using the margin of a region of a celestial sphere image. Then, in a case in which a margin is not necessary in the reproduction process, AdaptationSet and Reresentation with no margin can be selected, acquired and reproduced.

Note that it is necessary for a DASH client not corresponding to schemeIdUri of EssentialProperty to ignore AdaptationSet (or Representation or the like in some cases) in which this property is described. In addition, a DASH client not corresponding to schemeIdUri of SupplementalProperty may ignore the property value and use AdaptationSet (or Representation or the like in some cases).

Of course, other information can be further described in the MPD file.

<Delivery System (FIG. 24)>

Figure 24:
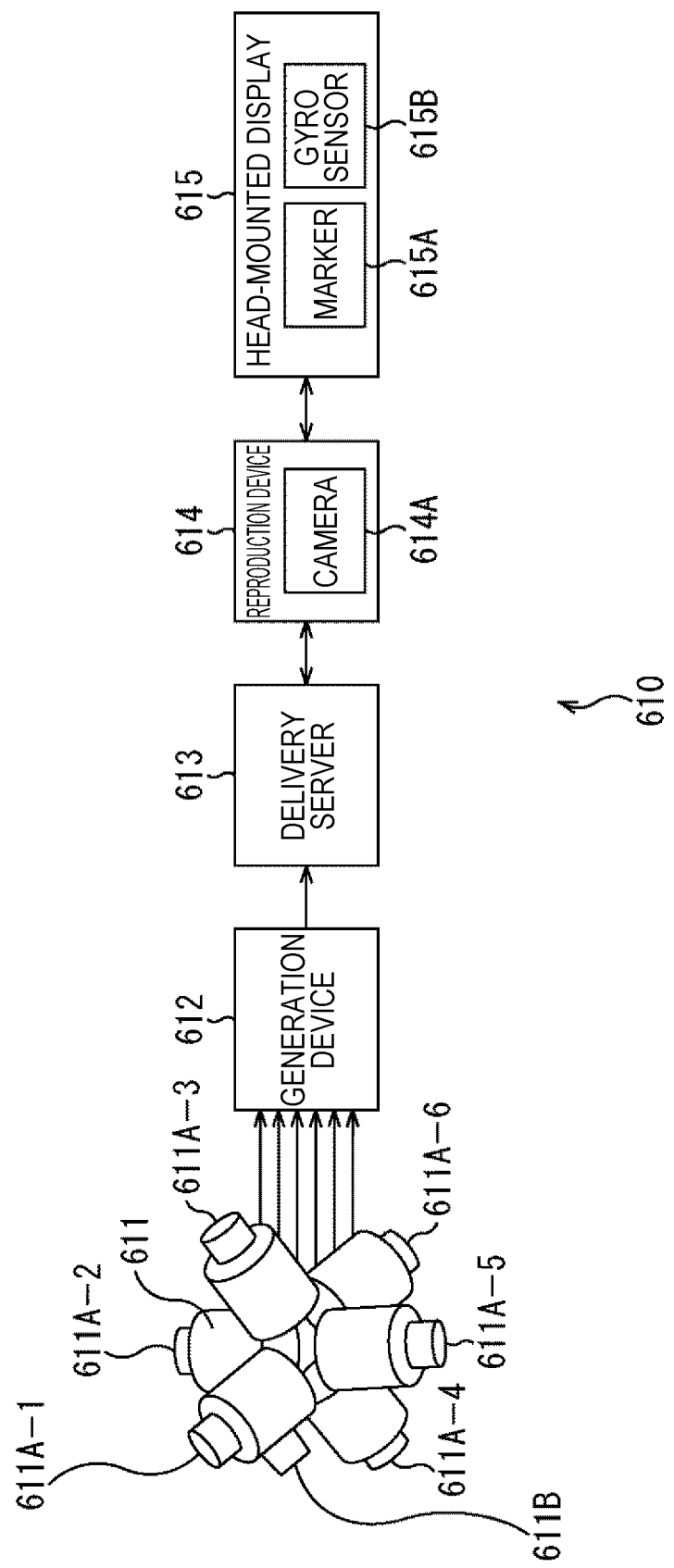
FIG. 24 is a block diagram illustrating a configuration example of a delivery system.

Next, a system that delivers a celestial sphere image including the region image with the margin described above will be described with reference to FIG. 24. FIG. 24 is a block diagram illustrating a configuration example of a delivery system.

A delivery system 610 in FIG. 24 includes a photographing device 611, a generation device 612, a delivery server 613, a reproduction device 614, and a head-mounted display 615. The delivery system 610 produces a celestial sphere image from photographed images photographed by the photographing device 611 and displays a display image with a visual field range of a viewer by using the celestial sphere image.

Specifically, the photographing device 611 of the delivery system 610 includes six cameras 611A-1 to 611A-6 and a microphone 611B. Note that, hereinafter, in a case in which it is not necessary to distinguish the cameras 611A-1 to 611A-6 from each other particularly, the cameras 611A-1 to 611A-6 are collectively referred to as the cameras 611A.

Each camera 611A photographs a moving image and the microphone 611B acquires a surrounding sound. The delivery system 610 supplies the photographed images which is a moving image of six directions photographed by each camera 611A and the sound acquired by the microphone 611B as moving image content to the generation device 612. Note that the number of cameras included in the photographing device 611 may be a number other than six as long as the number of cameras is plural.

The generation device 612 generates a celestial sphere image from the photographed images supplied from the photographing device 611 in accordance with a method using equirectangular projection and encodes the celestial sphere image at one or more bit rates to generate an equirectangular stream of each bit rate. In addition, the generation device 612 generates a celestial sphere image from the photographed images by cube mapping and encodes the celestial sphere image at one or more bit rates to generate a cube stream of each bit rate. In addition, the generation device 612 encodes the sound supplied from the photographing device 611 to generate an audio stream.

The generation device 612 forms the equirectangular stream of each bit rate, the cube stream of each bit rate, and the audio stream as ISOBMFF files. The generation device 612 uploads the ISOBMFF files generated as the result to the delivery server 613.

Note that, herein, the number of bit rates of the equirectangular stream and the cube stream is one or more and conditions (for example, the sizes of images or the like) other than the bit rates may be one or more.

In addition, the generation device 612 generates an MPD file for managing segment files of the moving image content and uploads the MPD file to the delivery server 613. Segments are formed by forming a video stream and an audio stream as files in time units from about several seconds to 10 seconds. For example, the ISOBMFF including RegionMappingBox is delivered as segment files.

For example, the delivery server 613 that performs delivery using MEPG-DASH (ISO/IEC 23009-1) stores the segment files and the MPD files uploaded from the generation device 612. The delivery server 613 transmits the stored segment files to the reproduction device 614 in response to a request from the reproduction device 614 serving as a client.

The reproduction device 614 gives a request for the ISOBMFF files to the delivery server 613 and receives the ISOBMFF files transmitted in response to the request. In addition, the reproduction device 614 requests the segment files of the celestial sphere image generated in accordance with a method of producing the celestial sphere image corresponding to mapping which can be performed by the reproduction device 614 on the basis of the ISOBMFF files and receives the segment files transmitted in response to the request. The reproduction device 614 decodes the cube stream (or may decode equirectangular stream) included in the received segment files. The reproduction device 614 generates a 3D model image by mapping the celestial sphere image obtained as the decoding result to a 3D model.

In addition, the reproduction device 614 contains the camera 614A and photographs a marker 615A attached to the head-mounted display 615. Then, the reproduction device 614 detects a viewing position at a coordinate system of the 3D model on the basis of a photographed image of the marker 615A. Further, the reproduction device 614 receives a detection result of a gyro sensor 615B of the head-mounted display 615 from the head-mounted display 615. The reproduction device 614 decides a visual line direction of a viewer on the coordinate system of the 3D model on the basis of the detection result of the gyro sensor 615B. The reproduction device 614 decides a visual field range of a viewer located inside the 3D model on the basis of the viewing position and the visual line direction.

The reproduction device 614 produces an image in the visual field range of the viewer as a display image by performing the perspective projection on the 3D model image within the visual field range of the viewer using the viewing position as a focus. The reproduction device 614 supplies the display image to the head-mounted display 615.

The head-mounted display 615 is mounted on the head of the viewer and displays the display image supplied from the reproduction device 614. The marker 615A photographed by the camera 614A is attached to the head-mounted display 615. Accordingly, the viewer can designate a viewing position, moving in a state in which the head-mounted display 615 is mounted on his or her head. In addition, the gyro sensor 615B is contained in the head-mounted display 615 and a detection result of an angular velocity by the gyro sensor 615B is transmitted to the reproduction device 614. Accordingly, the viewer can designate a visual line direction, rotating his or her head on which the head-mounted display 615 is mounted.

<Generation Device (FIGS. 25 and 26)>

Figure 25:
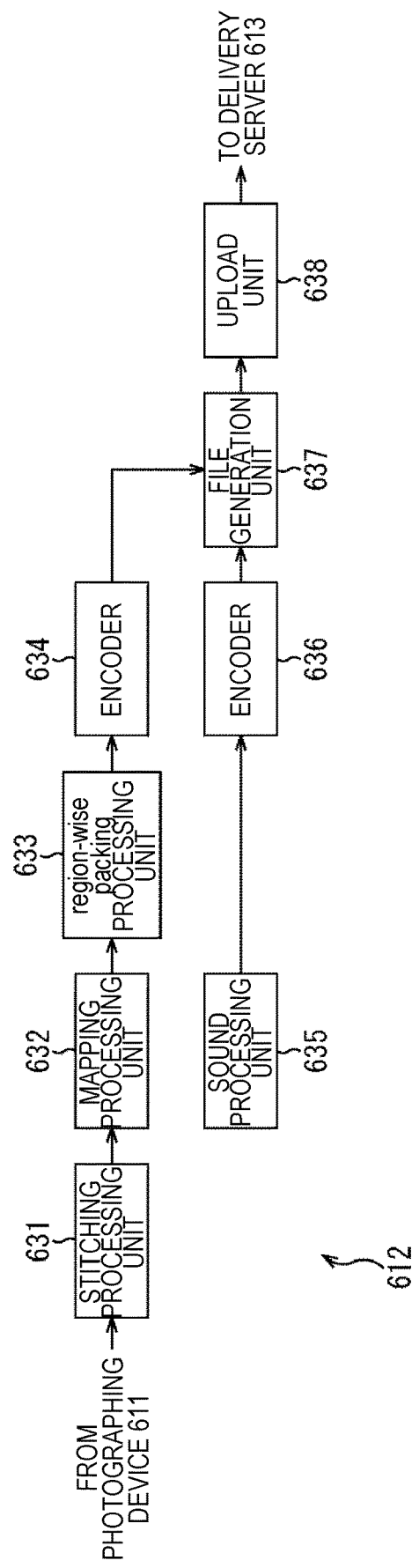
FIG. 25 is a block diagram illustrating a configuration example of a generation device.

FIG. 25 is a block diagram illustrating a configuration example of the generation device. The generation device 612 includes a stitching processing unit 631, a mapping processing unit 632, a region-wise packing processing unit 633, an encoder 634, a sound processing unit 635, an encoder 636, a file generation unit 637, and an upload unit 638.

The stitching processing unit 631 performs a stitching process of causing color or brightness of the photographed images of the six directions supplied from the camera 611A in FIG. 24 to be the same for each frame and removing overlap for connection. The stitching processing unit 631 supplies the photographed images of a frame unit after the stitching process to the mapping processing unit 632.

The mapping processing unit 632 generates a celestial sphere image from photographed images supplied from the stitching processing unit 631 by cube mapping in this example. Specifically, the mapping processing unit 632 maps the photographed images after the stitching process as texture to a cube to generate a development image of the cube as a celestial sphere image. The mapping processing unit 632 supplies the celestial sphere image to the region-wise packing processing unit 633. Note that the stitching processing unit 631 and the mapping processing unit 632 may be integrated.

The region-wise packing processing unit 633 performs a region-wise packing process. That is, a packed frame is generated by changing the position and the size of a projected frame for each region, disposing the projected frame on a 2-dimensional surface, and performing packing. The region-wise packing processing unit 633 also generates RegionMappingBox including margin_flag and region_margin_type.

The encoder 634 encodes the celestial sphere image supplied from the region-wise packing processing unit 633 at one or more bit rates to generate a cube stream. The encoder 634 supplies the cube stream of each bit rate to the file generation unit 637.

The sound processing unit 635 acquires the sound supplied from the microphone 611B in FIG. 24 and supplies the sound to the encoder 636. The encoder 636 encodes the sound supplied from the sound processing unit 635 to generate an audio stream. The encoder 636 supplies the audio stream to the file generation unit 637.

The file generation unit 637 forms the cube stream of each hit rate and the audio stream as files in units of segments. The file generation unit 637 supplies the segment files generated as the result to the upload unit 638. In addition, the file generation unit 637 also generates an ISOBMFF file and supplies the ISOBMFF to the upload unit 638.

The upload unit 638 uploads the segment files supplied from the file generation unit 637 and the ISOBMFF file to the delivery server 613 in FIG. 24.

Figure 26:
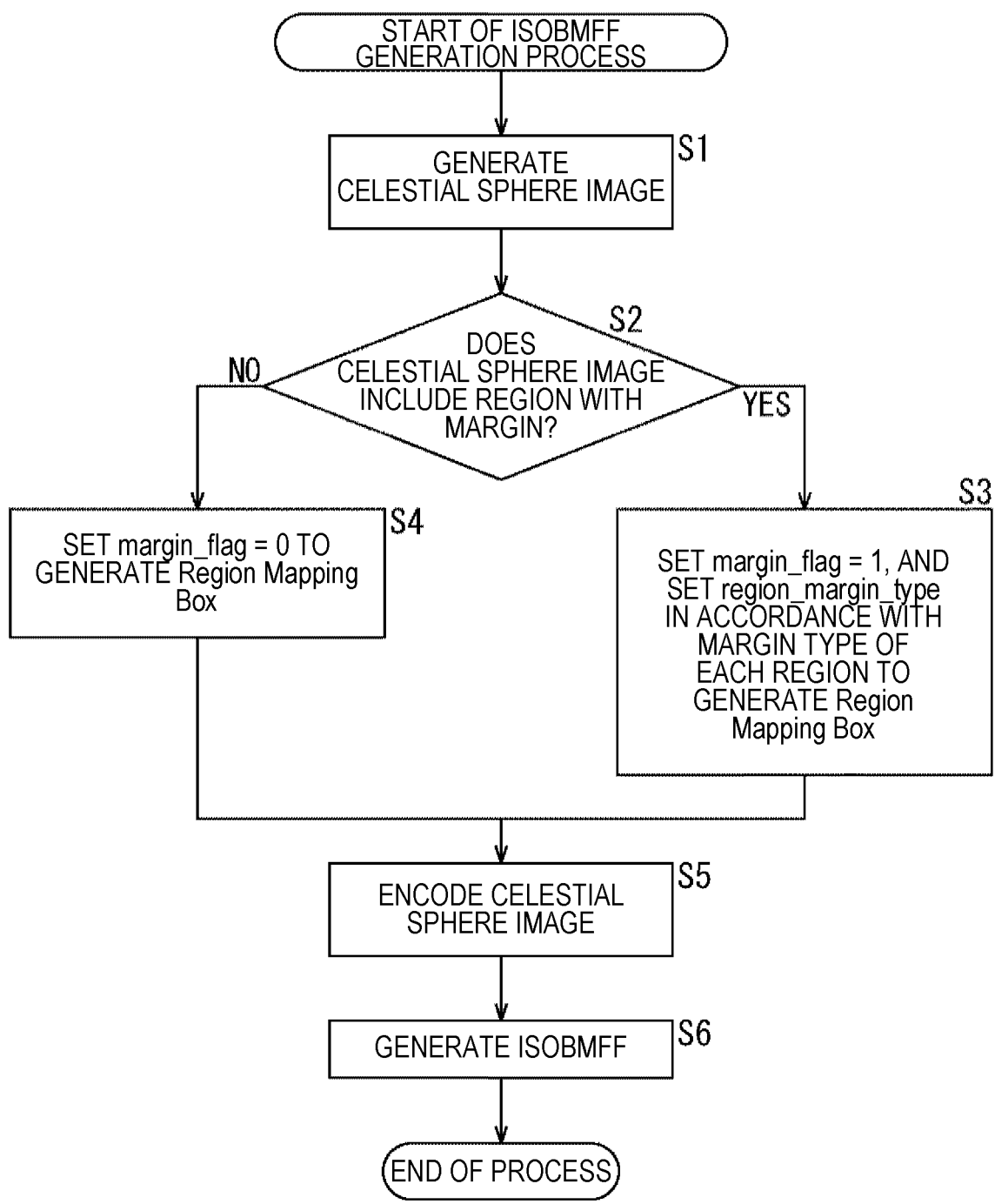
FIG. 26 is an explanatory flowchart illustrating an ISOBMFF generation process.

Next, an ISOBMFF generation process will be described with reference to FIG. 26. FIG. 26 is an explanatory flowchart illustrating the ISOBMFF generation process. A case in which an image is processed will be mainly described as an example.

In step S1, the stitching processing unit 631 performs a stitching process of causing color or brightness of the photographed images of the six directions supplied from the camera 611A in FIG. 24 to be the same for each frame and removing overlap for connection. The stitching processing unit 631 supplies the photographed images of a frame unit after the stitching process to the mapping processing unit 632.

The mapping processing unit 632 generates a celestial sphere image from photographed images supplied from the stitching processing unit 631 by, for example, cube mapping. That is, the mapping processing unit 632 maps the photographed images after the stitching process as texture to a cube to generate a development image of the cube as a celestial sphere image. In addition, at this time, the mapping processing unit 632 generates a margin of a region of the celestial sphere image. The mapping processing unit 632 supplies the celestial sphere image to the region-wise packing processing unit 633.

In step S2, the region-wise packing processing unit 633 determines whether the celestial sphere image includes a region with a margin. In a case in which the celestial sphere image includes the region with the margin, the region-wise packing processing unit 633 sets margin_flag=1 (including the region with the margin) and sets region_margin_type in accordance with a type of margin of each region in step S3. That is, as described above, Value 0 is set in a region with no margin, Value 1 is set in a region with a margin that has corners, and Value 2 is set in a region with a margin that has no corner. Then, the region-wise packing processing unit 633 generates RegionMappingBox including these regions.

Conversely, in a case in which it is determined in step S2 that the celestial sphere image does not include the region with the margin, the region-wise packing processing unit 633 sets margin_flag=0 (only the region with no margin) to generate RegionMappingBox including margin_flag=0 in step S4.

After the processes of step S3 and step S4, the encoder 634 encodes the celestial sphere image in step S5. Sound data processed by the sound processing unit 635 is encoded by the encoder 636 to be supplied to the file creation unit 637.

In step S6, the file creation unit 637 generates an ISOBMFF file. The file generated by the file creation unit 637 is uploaded from the upload unit 638 to the delivery server 613.

<Reproduction Device (FIGS. 27 and 28)>

Figure 27:
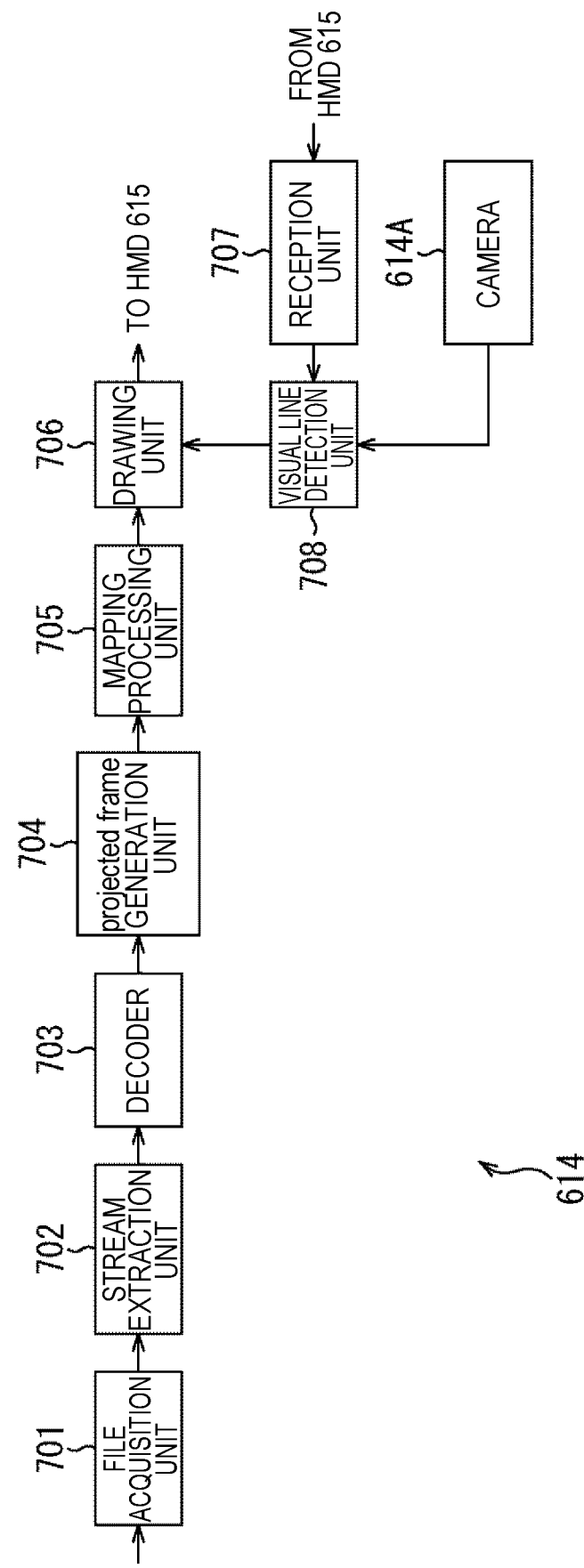
FIG. 27 is a block diagram illustrating a configuration example of a reproduction device.

Next, a case in which an image is processed is used as an example, a configuration example of the reproduction device 614. FIG. 27 is a block diagram illustrating a configuration example of the reproduction device. The reproduction device 614 includes a file acquisition unit 701, a stream extraction unit 702, a decoder 703, a projected frame generation unit 704, a mapping processing unit 705, a drawing unit 706, a reception unit 707, a visual line detection unit 708, and a camera 614A.

The file acquisition unit 701 acquires a reproduction target file from the delivery server 613 in FIG. 24. The stream extraction unit 702 extracts a video stream from the file acquired by the file acquisition unit 701. The decoder 703 decodes the video stream extracted by the stream extraction unit 702. The projected frame generation unit 704 generates a projected frame from image data decoded by the decoder 703.

The mapping processing unit 705 maps the celestial sphere image supplied from the projected frame generation unit 704 as texture to each of the six faces of the cube 12.

The drawing unit 706 generates an image within a visual field range of a viewer as a display image by performing the perspective projection on a 3D model image supplied from the mapping processing unit 705 within the visual field range of the viewer using a viewing position supplied from the visual line detection unit 708 as a focus. The drawing unit 706 supplies the display image to the head-mounted display 615.

The reception unit 707 receives a detection result of the gyro sensor 615B in FIG. 24 from the head-mounted display 615 and supplies the detection result to the visual line detection unit 708.

The visual line detection unit 708 decides a visual line direction of the viewer in a coordinate system of a 3D model on the basis of the detection result of the gyro sensor 615B supplied from the reception unit 707. In addition, the visual line detection unit 708 acquires a photographed image of the marker 615A from the camera 614A and detects a viewing position in the coordinate system of the 3D model on the basis of the photographed image. The visual line detection unit 708 decides a visual field range of the viewer in the coordinate system of the 3D model on the basis of the viewing position and a visual line direction in the coordinate system of the 3D model. The visual line detection unit 708 supplies the visual field range and the viewing position of the viewer to the drawing unit 706.

Next, an operation of the reproduction device 614 will be described with reference to FIG. 28. FIG. 28 is an explanatory flowchart illustrating an ISOBMFF reproduction process. A case of the cube projection and a processing case of the region image will be described mainly as an example.

In step S21, the file acquisition unit 701 acquires a reproduction target file from the delivery server 613 in FIG. 24. Further, the file acquisition unit 701 determines which type margin_flag is. In a case in which margin_flag is Value 1 (a case in which the celestial sphere image includes a region with a margin), the file acquisition unit 701 determines in step S22 whether a reproduction client uses the margin of the region. That is, the reproduction device 614 determines whether the reproduction device 614 has a function of using the margin.

In a case in which the reproduction device 614 uses the margin, the stream extraction unit 702 extracts a video stream from the file acquired by the file acquisition unit 701 in step S23. Then, the decoder 703 decodes the extracted stream and supplies the decoded stream to the projected frame generation unit 704.

In step S24, the projected frame generation unit 704 acquires the region with the margin on the basis of the information regarding RegionMappingBox and generates a projected frame. In step S25, a rendering process is performed on the region in the celestial sphere image by performing a process such as blending on the margin. That is, the mapping processing unit 705 maps the celestial sphere image as texture to each of the six faces of the cube 12. The drawing unit 706 generates an image within a visual field range of a viewer as a display image by performing the perspective projection on a 3D model image supplied from the mapping processing unit 705 within the visual field range of the viewer using a viewing position supplied from the visual line detection unit 708 as a focus. The drawing unit 706 supplies the display image to the head-mounted display 615.

In a case in which it is determined in step S22 that the reproduction client does not use the margin of the region, that is, the reproduction device 614 does not have the function of using the margin, the process proceeds to step S26. In step S26, the stream extraction unit 702 extracts a video stream from a file acquired by the file acquisition unit 701. Then, the decoder 703 decodes the extracted stream and supplies the decoded stream to the projected frame generation unit 704.

In step S27, the projected frame generation unit 704 acquires the region with no margin on the basis of the information regarding RegionMappingBox. In step S28, a process of rendering the celestial sphere image is performed. That is, the mapping processing unit 705 maps the celestial sphere image as texture to each of the six faces of the cube 12. The drawing unit 706 generates an image within a visual field range of a viewer as a display image by performing the perspective projection on a 3D model image supplied from the mapping processing unit 705 within the visual field range of the viewer using a viewing position supplied from the visual line detection unit 708 as a focus. The drawing unit 706 supplies the display image to the head-mounted display 615.

In a case in which it is determined in step S21 that margin_flag is Value 0 (a case of only the region with no margin), the stream extraction unit 702 extracts a video stream from the file acquired by the file acquisition unit 701 in step S29. Then, the decoder 703 decodes the extracted stream and supplies the decoded stream to the projected frame generation unit 704.

In step S30, the projected frame generation unit 704 acquires a region image on the basis of the information on the basis of the information regarding RegionMappingBox.

In step S31, the process of rendering the celestial sphere image is performed. That is, the mapping processing unit 705 maps the celestial sphere image as texture to each of the six faces of the cube 12. The drawing unit 706 generates an image within a visual field range of a viewer as a display image by performing the perspective projection on a 3D model image supplied from the mapping processing unit 705 within the visual field range of the viewer using a viewing position supplied from the visual line detection unit 708 as a focus. The drawing unit 706 supplies the display image to the head-mounted display 615.

In this way, in the reproduction process, the reproduction client can determine whether or not the celestial sphere image has a region with a margin in accordance with margin_flag. In a case in which the celestial sphere image has the region with the margin, for example, the reproduction client can obtain appropriate region information and perform the rendering process in accordance with whether to perform the rendering using the region with the margin or the rendering using the region with no margin.

Note that ISOBMFF includes a plurality of video tracks, and tracks of a celestial sphere image including only regions with no margins and tracks of a celestial sphere image including regions with margins are mixed in some cases. In these cases, a client which does not use margins can select and reproduce the tracks of the celestial sphere image including only the regions with no margins and a client which uses margins can select and reproduce the tracks of the celestial sphere image including the regions with the margins.

The process performed on the image has been described mainly above, but sound information is delivered along with image information.

According to the present technology, the client that uses margins can easily acquire the regions including the margins and the client that does not use margins can easily acquire regions including no margins.

Further, by delivering whether or not a celestial sphere image has regions with margins as a flag, a client that does not use margins can easily select a celestial sphere image with no margins. In addition, a client that uses margins can easily select a celestial sphere image with margins.

Note that the present technology can be embodied in various modification examples within the scope of the present technology without departing from the nature of the present technology.

Computer (FIG. 29)

FIG. 38 is a block diagram illustrating an exemplary hardware configuration of a computer that executes a series of processing described above by a program.

In the computer 900, a central processing unit (CPU) 901, a read only memory (ROM) 902, and a random access memory (RAM) 903 are connected to one another by a bus 904.

An input/output interface 905 is further connected to the bus 904. An input unit 906, an output unit 907, a storage unit 908, a communication unit 909, and a drive 910 are connected to the input/output interface 905.

The input unit 906 includes a keyboard, a mouse, a microphone, or the like. The output unit 907 includes a display, a speaker, or the like. The storage unit 908 includes a hard disk, a nonvolatile memory, or the like. The communication unit 909 includes a network interface or the like. The drive 910 drives a removable medium 911 such as a magnetic disk, an optical disk, a magneto-optical disk, or a semiconductor memory.

In the computer 900 configured as described above, the CPU 901 loads a program that is stored, for example, in the storage unit 908 onto the RAM 903 via the input/output interface 905 and the bus 904, and executes the program. Thus, the above-described series of processing is performed.

Programs to be executed by the computer 900 (the CPU 901) are provided being recorded in the removable medium 911 which is a packaged medium or the like. Also, programs may be provided via a wired or wireless transmission medium, such as a local area network, the Internet or digital satellite broadcasting.

In the computer 900, by inserting the removable medium 911 into the drive 910, the program can be installed in the storage unit 908 via the input/output interface 905. Further, the program can be received by the communication unit 909 via a wired or wireless transmission medium and installed in the storage unit 908. Moreover, the program can be installed in advance in the ROM 902 or the storage unit 908.

It should be noted that the program executed by the computer 900 may be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

Further, the advantageous effects described in the present specification are merely examples and are not limitative, and other advantageous effects may be achieved.

Further, an embodiment of the disclosure is not limited to the embodiments described above, and various changes and modifications may be made without departing from the scope of the disclosure.

Others

Additionally, the present technology may also be configured as below (1)

A generation device including:

an identification information generation unit configured to generate margin identification information for identifying that a celestial sphere image includes a region with a generated margin in a region of the celestial sphere image.

(2)

The generation device according to (1), further including: a margin generation unit configured to generate a margin of a region of the celestial sphere image.

(3)

The generation device according to (1) or (2), in which the margin is formed outside the region.

(4)

The generation device according to (2) or (3), in which region information regarding a region with the margin is represented by a spherical coordinate system or a 2-dimensional coordinate system.

(5)

The generation device according to any of (2) to (4), in which the region information is represented as information regarding a projected frame or a packed frame.

(6)

The generation device according to (5), in which the region information regarding a region with the margin of the projected frame is described in a case in which the region has the margin.

(7)

The generation device according to (5) or (6), in which the region information regarding a region with the margin of the packed frame is described in a case in which the region is packed by region-wise packing.

(8)

The generation device according to any of (5) to (7), in which the region information regarding a region with the margin of the projected frame includes a width and a height of a region including the margin of the projected frame and allocation identification information for identifying allocation of the margin in directions of the width and the height.

(9)

The generation device according to any of (5) to (8), in which the region information regarding a region with the margin of the packed frame includes a width and a height of a region with the margin of the projected frame and top and left coordinates of the region.

(10)

The generation device according to any of (5) to (9), in which the region information regarding a region with the margin of the packed frame is described in a case in which the packed frame is packed by region-wise packing.

(11)

The generation device according to (8), in which the allocation identification information is omitted.

(12)

The generation device according to any of (5) to (11), in which the region information regarding a region with the margin of the projected frame is omitted and only the region information regarding a region with the margin of the packed frame is described.

(13)

The generation device according to any of (1) to (12), in which, as the margin, there are types of margins which do and do not have a non-formed portion in which the margin is not formed in a corner.

(14)

The generation device according to (13), in which the identification information generation unit further generates type identification information for identifying the types.

(15)

The generation device according to (14), in which the region information regarding a region with the margin of the projected frame is described in a case in which the type identification information is the type of margin that does not have the non-formed portion.

(16)

The generation device according to any of (1) to (15), in which, in a case in which the region is a triangle and the margin is formed along a side of the triangle, the triangle is formed into a rectangle and the margin is disposed on a side of the rectangle corresponding to the triangle.

(17)

The generation device according to any of (1) to (16), in which the margin identification information is described in a box below Scheme information Box of ISOBMFF.

(18)

The generation device according to any of (1) to (17), in which the margin identification information is described in an MPD file of MPEG-DASH.

(19)

An identification information generation method including:

an identification information generation step of generating margin identification information for identifying that a celestial sphere image includes a region with a generated margin in a region of the celestial sphere image by a generation device.

(20)

A reproduction device including:

an acquisition unit configured to acquire margin identification information for identifying that a celestial sphere image includes a region with a margin;

a generation unit configured to generate a projected frame on the basis of the acquired margin identification information; and a rendering unit configured to render the projected frame.

(21)

An image generation method device including:

an acquisition step of acquiring margin identification information for identifying that a celestial sphere image includes a region with a margin by a reproduction device;

a generation step of generating a projected frame on the basis of the acquired margin identification information by the reproduction device; and a rendering step of rendering the projected frame by the reproduction device.

REFERENCE SIGNS LIST 610 delivery system
611 imaging device
612 generation device
613 delivery server
614 reproduction device
615 head-mounted display
631 stitching processing unit
632 mapping processing unit
633 region-wise packing processing unit
634 encoder
637 file generation unit
638 upload unit
701 file acquisition unit
704 packing frame generation unit
705 mapping processing unit
706 drawing unit

The invention claimed is:

1. A generation device comprising:
an identification information generation unit configured to generate margin identification information for identifying that a celestial sphere image includes a region with a generated margin in a region of the celestial sphere image,
wherein the margin has a width of a number of pixels that is a multiple of two in a case in which chroma sub-sampling is 4:2:2 or 4:2:0.

2. The generation device according to claim 1, further comprising:
a margin generation unit configured to generate a margin of a region of the celestial sphere image.

3. The generation device according to claim 2, wherein the margin is formed outside the region.

4. The generation device according to claim 3, wherein region information regarding a region with the margin is represented by a spherical coordinate system or a 2-dimensional coordinate system.

5. The generation device according to claim 4, wherein the region information is represented as information regarding a projected frame or a packed frame.

6. The generation device according to claim 5, wherein the region information regarding a region with the margin of the projected frame is described in a case in which the region has the margin.

7. The generation device according to claim 6, wherein the region information regarding a region with the margin of the packed frame is described in a case in which the region is packed by region-wise packing.

8. The generation device according to claim 7, wherein the region information regarding a region with the margin of the projected frame includes a width and a height of a region including the margin of the projected frame and allocation identification information for identifying allocation of the margin in directions of the width and the height.

9. The generation device according to claim 8, wherein the region information of the region with the margin of the packed frame includes a width and a height of the region including the margin of the packed frame and upper left coordinates of the region.

10. The generation device according to claim 9, wherein the region information regarding a region with the margin of the packed frame is described in a case in which the packed frame is packed by region-wise packing.

11. The generation device according to claim 8, wherein the allocation identification information is omitted.

12. The generation device according to claim 9, wherein the region information regarding a region with the margin of the projected frame is omitted and only the region information regarding a region with the margin of the packed frame is described.

13. The generation device according to claim 8, wherein the margin is of a type which does have a non-formed portion in which the margin is not formed in a corner.

14. The generation device according to claim 6, wherein the margin has a width of a number of pixels that is a multiple of eight, or a width of a number of pixels that is a multiple of sixteen.

15. The generation device according to claim 5, wherein, in a case in which the region is a triangle and the margin is formed along a side of the triangle, the triangle is formed into a rectangle and the margin is disposed on a side of the rectangle corresponding to the triangle.

16. The generation device according to claim 3, wherein the margin identification information is described in a box that is disposed below a Scheme Information Box of ISOB-MFF.

17. The generation device according to claim 3, wherein the margin identification information is described in an MPD file of MPEG-DASH.

18. An identification information generation method comprising:
an identification information generation step of generating margin identification information for identifying that a celestial sphere image includes a region with a generated margin in a region of the celestial sphere image by a generation device,
wherein the margin has a width of a number of pixels that is a multiple of two in a case in which chroma sub-sampling is 4:2:2 or 4:2:0.

19. A reproduction device comprising:
an acquisition unit configured to acquire margin identification information for identifying that a celestial sphere image includes a region with a margin;
a generation unit configured to generate a projected frame on a basis of the acquired margin identification information; and
a rendering unit configured to render the projected frame,
wherein the margin has a width of a number of pixels that is a multiple of two in a case in which chroma sub-sampling is 4:2:2 or 4:2:0.

20. An image generation method device comprising:
an acquisition step of acquiring margin identification information for identifying that a celestial sphere image includes a region with a margin by a reproduction device;
a generation step of generating a projected frame on a basis of the acquired margin identification information by the reproduction device; and
a rendering step of rendering the projected frame by the reproduction device,
wherein the margin has a width of a number of pixels that is a multiple of two in a case in which chroma sub-sampling is 4:2:2 or 4:2:0.

21. The generation device according to claim 8, wherein the margin is of a type which does not have a non-formed portion in which the margin is not formed in a corner.

* * * * *